United States Patent
Tanaka et al.

(10) Patent No.: US 8,259,327 B2
(45) Date of Patent: Sep. 4, 2012

(54) PRINTING SYSTEM AND PRINTING METHOD

(75) Inventors: Kazuyoshi Tanaka, Hachioji (JP); Masahiko Kamei, Kunitachi (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 1285 days.

(21) Appl. No.: 11/944,885

(22) Filed: Nov. 26, 2007

(65) Prior Publication Data

US 2008/0151273 A1    Jun. 26, 2008

(30) Foreign Application Priority Data

Nov. 29, 2006  (JP) .................. 2006-321427

(51) Int. Cl.
*G06F 3/00* (2006.01)
(52) U.S. Cl. ............................ 358/1.15; 270/1.02
(58) Field of Classification Search ............ 358/1.1, 358/1.15, 1.18, 1.17, 1.16
See application file for complete search history.

(56) References Cited

U.S. PATENT DOCUMENTS

| | | | |
|---|---|---|---|
| 5,143,362 A | | 9/1992 | Doane et al. |
| 5,314,176 A * | | 5/1994 | Schmitt ................ 270/1.03 |
| 6,129,346 A * | | 10/2000 | Zorn ................... 270/52.19 |
| 7,113,959 B1 * | | 9/2006 | Klatt et al. ............... 705/7.21 |
| 7,605,936 B2 * | | 10/2009 | Uchida et al. ............. 358/1.15 |
| 7,626,717 B2 * | | 12/2009 | Rai et al. ................ 358/1.15 |
| 2003/0014385 A1 * | | 1/2003 | Chow ......................... 707/1 |

FOREIGN PATENT DOCUMENTS

| JP | 2001-239697 A | 9/2001 |
|---|---|---|
| JP | 2006-235664 A | 9/2006 |

* cited by examiner

*Primary Examiner* — Marivelisse Santiago Cordero
*Assistant Examiner* — Kent Yip
(74) *Attorney, Agent, or Firm* — Holtz, Holtz, Goodman & Chick, PC

(57) ABSTRACT

A printing system having: an order management terminal for instructing to create a printed matter, the order management terminal including; a communication interface section which obtains a list of destinations including a plurality of destination information and a distribution image information; and a printing instruction section which forms a printing instruction information including the destination information, the distribution image information and a print setting information and sends the printing instruction information to an image forming apparatus for creating the printed matter according to an instruction of the order management terminal; and the image forming apparatus including; an image forming section which executes printing of the destination information onto a cover sheet for each destination and printing of the distribution image information onto a distribution sheet continuously according to the printing instruction information; and a finishing section forming a printed.

17 Claims, 19 Drawing Sheets

FIG. 8 (a)
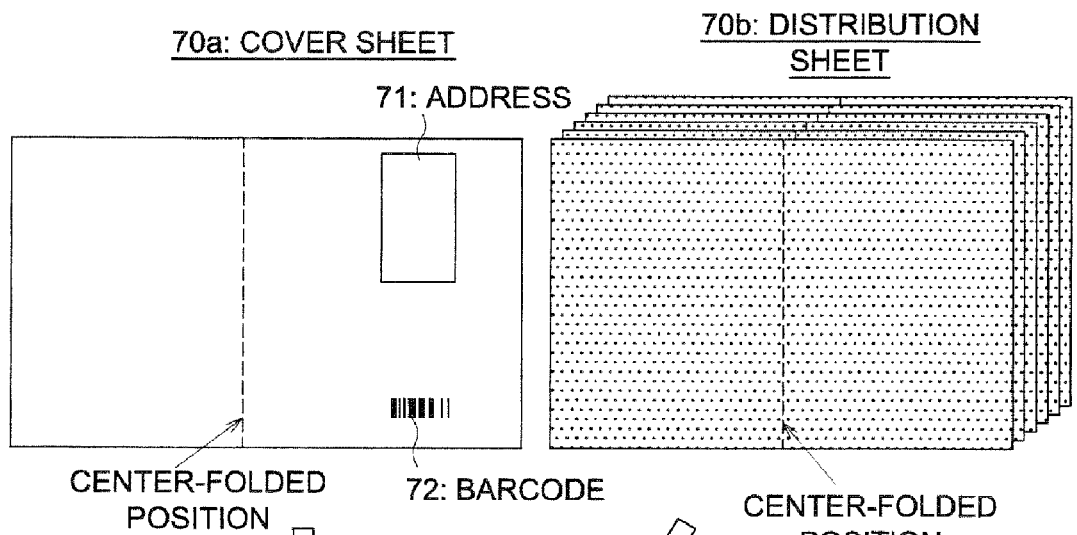
FIG. 8 (b)
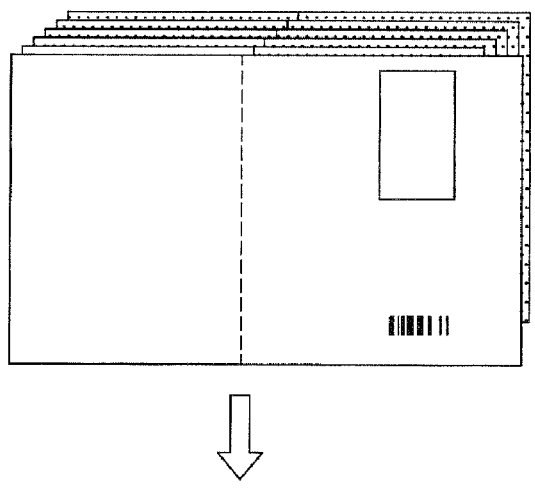
FIG. 8 (c)   FIG. 8 (d)
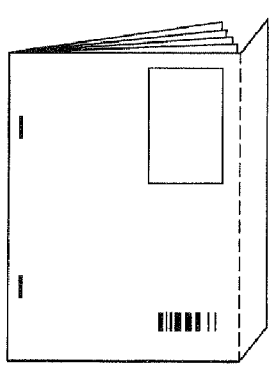 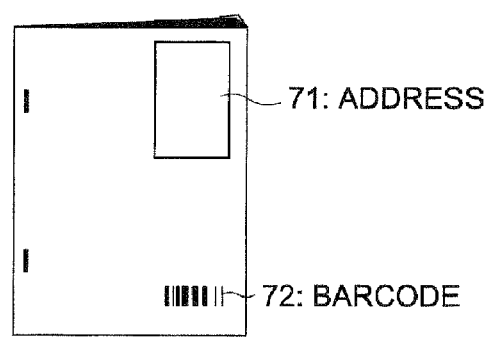

FIG. 19

| ORDER MANAGEMENT NUMBER | NAME | ADDRESS | TELEPHONE | MAIL ADDRESS | ORDER DATE |
|---|---|---|---|---|---|
| 1 | Tanaka | Tokyo*** | 03-xxxx-xxxx | aaa@xxx.co.jp | 2006.11.29 |
| 2 | Suzuki | Tokyo*** | 03-yyyy-yyyy | bbb@yyy.co.jp | 2006.11.29 |
| ... | | | | | |
| N | Sato | Osaka*** | 06-zzzz-zzzz | ccc@zzz.co.jp | 2006.11.29 |

FIG. 20

| ORDER MANAGEMENT NUMBER | NAME | ADDRESS | TELEPHONE | MAIL ADDRESS | ORDER DATE | IMAGE ID |
|---|---|---|---|---|---|---|
| 1 | Tanaka | Tokyo*** | 03-xxxx-xxxx | aaa@xxx.co.jp | 2006.11.29 | IMAGE 1 |
| 2 | Suzuki | Tokyo*** | 03-yyyy-yyyy | bbb@yyy.co.jp | 2006.11.29 | IMAGE 2 |
| ... | | | | | | |
| N | Sato | Osaka*** | 06-zzzz-zzzz | ccc@zzz.co.jp | 2006.11.29 | IMAGE 1, IMAGE 2 |

PRINTING SYSTEM AND PRINTING METHOD

RELATED APPLICATION

This application is based on Japanese Patent Application No. 2006-321427 filed on Nov. 29, 2006 in Japan Patent Office, the entire content of which is hereby incorporated by reference

BACKGROUND OF THE INVENTION

The present invention relates to a printed booklet formed by integration of a cover sheet printed with address and a distribution sheet such as advertisement; an image forming apparatus and control program for printing this printed booklet; a printing system including this image forming apparatus; and a printing method.

TECHNICAL FIELD

There has been widespread use of a photocopier or a multifunction peripheral equipped with a copying function and facsimile function, printer function and scanner function (hereinafter referred to as "image forming apparatus"). In the conventional method, when the advertisement printed by this image forming apparatus is to be sent as a direct mail for the purpose of sales and sales promotion, a printing company having received a request from a customer uses an image forming apparatus to print a plurality of advertisements 100 by offset collectively as shown in FIG. 16. At the same time, a plurality of address labels 101 are sequentially printed and the advertising booklets 100 having been created are placed into envelopes 102. Then address labels 101 are pasted on the envelopes 102, which are then sent to a delivery business company. The barcode labels 103 containing information for delivery management are pasted on the envelopes 102 by the delivery business company, whereby the printed advertisements are sent to each user (first conventional example).

Some of the recently developed image forming apparatuses contain a so-called variable printing function wherein text and images are replaced as desired, and are printed, as shown in the following Patent Document 1. When this variable printing function is used, a printing company having received a request from a customer uses an image forming apparatus to print a plurality of advertisements 100 by offset collectively as shown in FIG. 17. At the same time, a plurality of address sheets 104 are sequentially printed by the variable printing function and the address sheet 104 and advertising booklets 100 having been created are placed into transparent envelopes 105, which are then sent to a delivery business company. The barcode labels 103 are pasted on the transparent envelope 105 by the delivery business company, whereby the printed sheets are sent to each user (second conventional example).
[Patent Document 1]
Unexamined Japanese Patent Application Publication No. 2006-235664

The aforementioned first conventional example requires the steps of putting the advertising booklets 100 into the envelopes 102, pasting the address labels 101 on the envelopes 102 and pasting the barcode labels 103 on the envelopes 102. These numerous steps have required a great deal of costs.

Similarly, the second conventional example requires the steps of putting the address sheets 104 and advertising booklets 100 together, placing them into transparent envelopes 105, and pasting the barcode labels 103 on the transparent envelopes 105. These numerous steps have required a great deal of costs.

In both the aforementioned methods, advertisements 100 and address labels 101 or address sheet 104 are printed separately. A step of sorting is essential when there is a different type of the advertisements 100 for each user. When sorting is done manually, human errors are likely to occur. When sorting is done by an image forming apparatus, sheet feed error and such related errors tend to occur. Especially when a document 106 address to each individual such as a bill and an advertisements 100 are sent under the same cover as shown in FIG. 18, printing of the document 106 for each individual must be performed separately from printing of the advertisement 100 and address sheet 104. This complicates the step of sorting, and gives a greater chance of causing errors.

Further, when the document 106 for each individual and advertisement 100 are sent under the same cover, the document 106 for each individual is separate from the advertisement 100. Thus, some users may check only the document 106 for each individual and may discard the advertisement. This reduces the effect of advertisement in the conventional art.

SUMMARY

The major object of the present invention is to solve the aforementioned problems and to provide a printed booklet, an image forming apparatus and control program for printing such a printed booklet, and a printing system and printing method for producing a printed booklet using this image forming apparatus, wherein the cost and the number of work steps are reduced, an error is prevented from occurring, and the effect of advertisements is enhanced.

To achieve the aforementioned object, according to the main aspect of the present invention, there is provided a printing system having:

an order management terminal for instructing to create a printed matter, the order management terminal comprising;
    a communication interface section which obtains a list of destinations including a plurality of destination information and a distribution image information; and
    a printing instruction section which forms a printing instruction information including the destination information, the distribution image information and a print setting information and sends the printing instruction information to an image forming apparatus for creating the printed matter according to an instruction of the order management terminal; and
    the image forming apparatus comprising;
    an image forming section which executes printing of the destination information onto a cover sheet for each destination and printing of the distribution image information onto a distribution sheet continuously according to the printing instruction information; and
    a finishing section forming a printed booklet by integrating the cover sheet on which the destination information is printed and the distribution sheet on which the distribution image information is printed as one set through finishing a predetermined process to the cover sheet and to the distribution sheet.

And there is provided a printing method of a printing system comprising an order management terminal for instructing to create a printed matter and an image forming apparatus for creating the printed matter according to an instruction of the order management terminal, the printing method comprising:

obtaining a list of destinations including a plurality of destination information and a distribution image information;

forming a printing instruction information including the destination information, the distribution image information and a print setting information and sending the printing instruction information from the order management terminal to the image forming apparatus;

executing printing of the destination information onto a cover sheet for each destination and printing of the distribution image information onto a distribution sheet continuously through the image forming apparatus according to the printing instruction information; and forming a printed booklet by integrating the cover sheet on which the destination information is printed and the distribution sheet on which the distribution image information is printed as one set through finishing a predetermined process to the cover sheet and to the distribution sheet.

BRIEF DESCRIPTION OF THE DRAWINGS

FIG. 8(a), FIG. 8(b), FIG. 8(c) and FIG. 8(d) together represent a drawing schematically representing the printed booklet creation procedure in the first embodiment of the present invention;

FIG. 19 is an example of an destination information in the first embodiment of the present invention; and FIG. 20 is an example of an destination information in the second embodiment of the present invention.

DESCRIPTION OF THE PREFERRED EMBODIMENT

One of the preferred embodiments of the present invention includes:

an order service depot for requesting printing of a distribution image information such as an advertisement;

a printing service depot for creating a printed matter containing the distribution image information; and a delivery service depot for delivery of the printed matter to a user, wherein the order service depot is provided with a server for storing destination information, the distribution image information or individual destination information;

the printing service depot includes an order management terminal for management of the order from a client, and an image forming apparatus containing a variable printing function and finishing function; and the delivery service depot is provided with a delivery management terminal intended for printed matter delivery management.

Based on the information obtained from the server, the order management terminal creates a barcode for delivery management, creates printing instruction information for printing the cover sheet and distribution sheet in an integrated manner, and sends them to the image forming apparatus. Based on the printing instruction information, the image forming apparatus integrally prints the cover sheet including the address and barcode as well as, if required, individual destination information, and the distribution sheet including the distribution image information, and applies a process of finishing such as stapling, center folding, folding in three, or edge cutting by using the finishing function, thereby creates a printed booklet wherein the cover sheet is integrated with the distribution sheet. Then the printed booklet is held in a strip of paper and is sent to the delivery service depot. The delivery service depot performs delivery management, uses the barcode.

The aforementioned arrangement cuts down the cost and the number of processes in a printing company or delivery business company, and eliminates possible sorting errors. It also urges the user to view a distribution image information, whereby the effect of the advertisement is enhanced.

[Embodiment 1]

Figure 1:
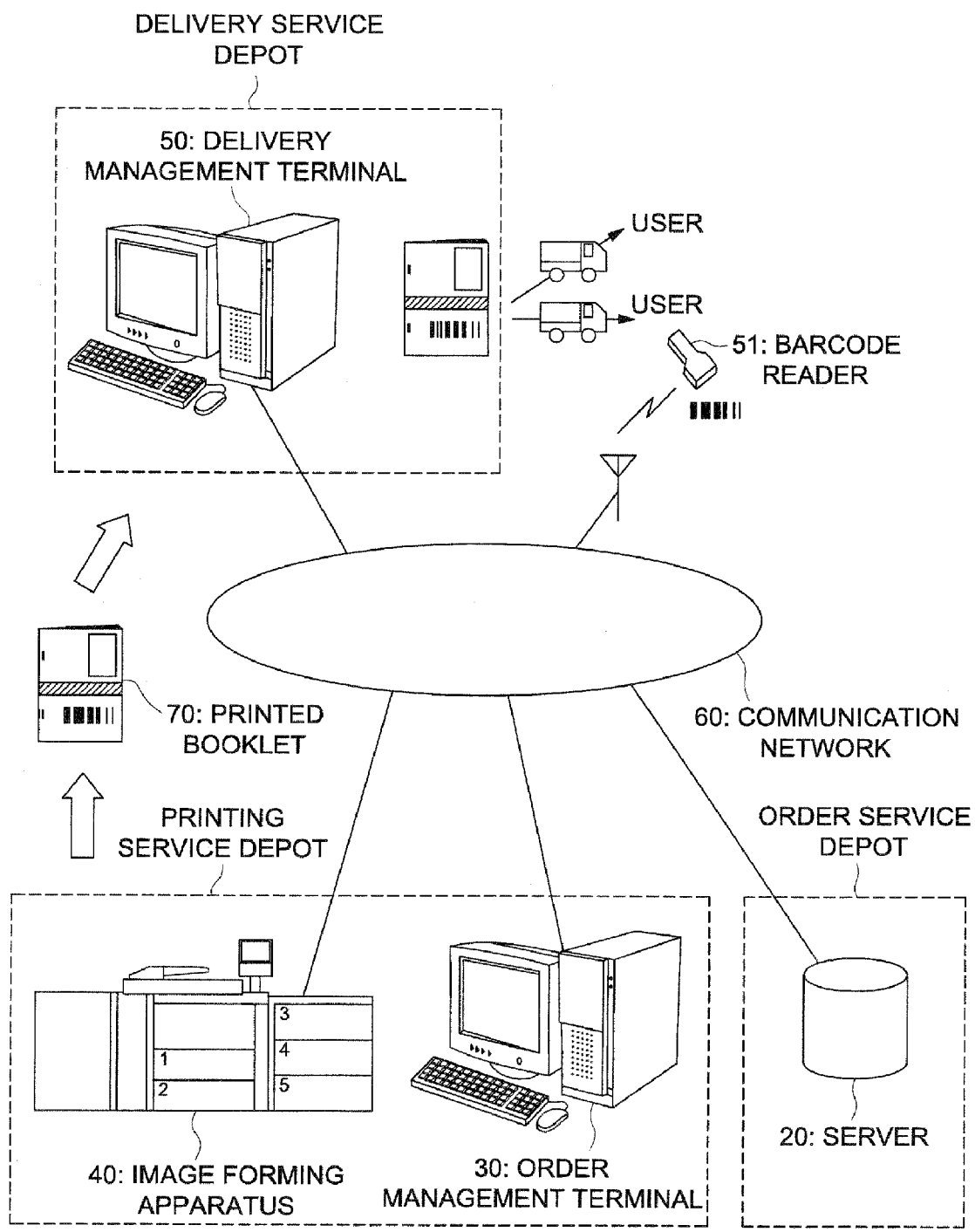
FIG. 1 is a drawing schematically representing the structure of the printing system in the first embodiment of the present invention.
Figure 2:
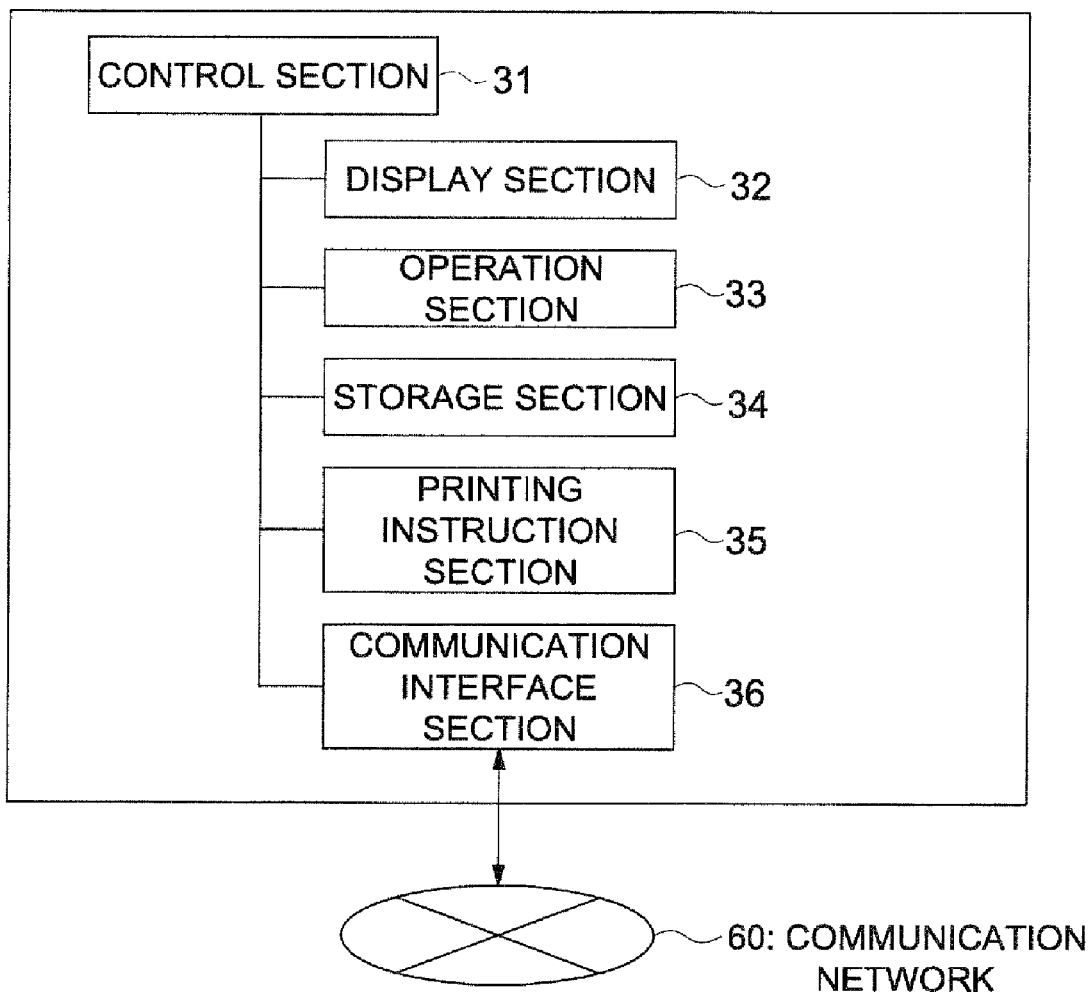
FIG. 2 is a block diagram representing the structure of the order management terminal in the first embodiment of the present invention.
Figure 3:
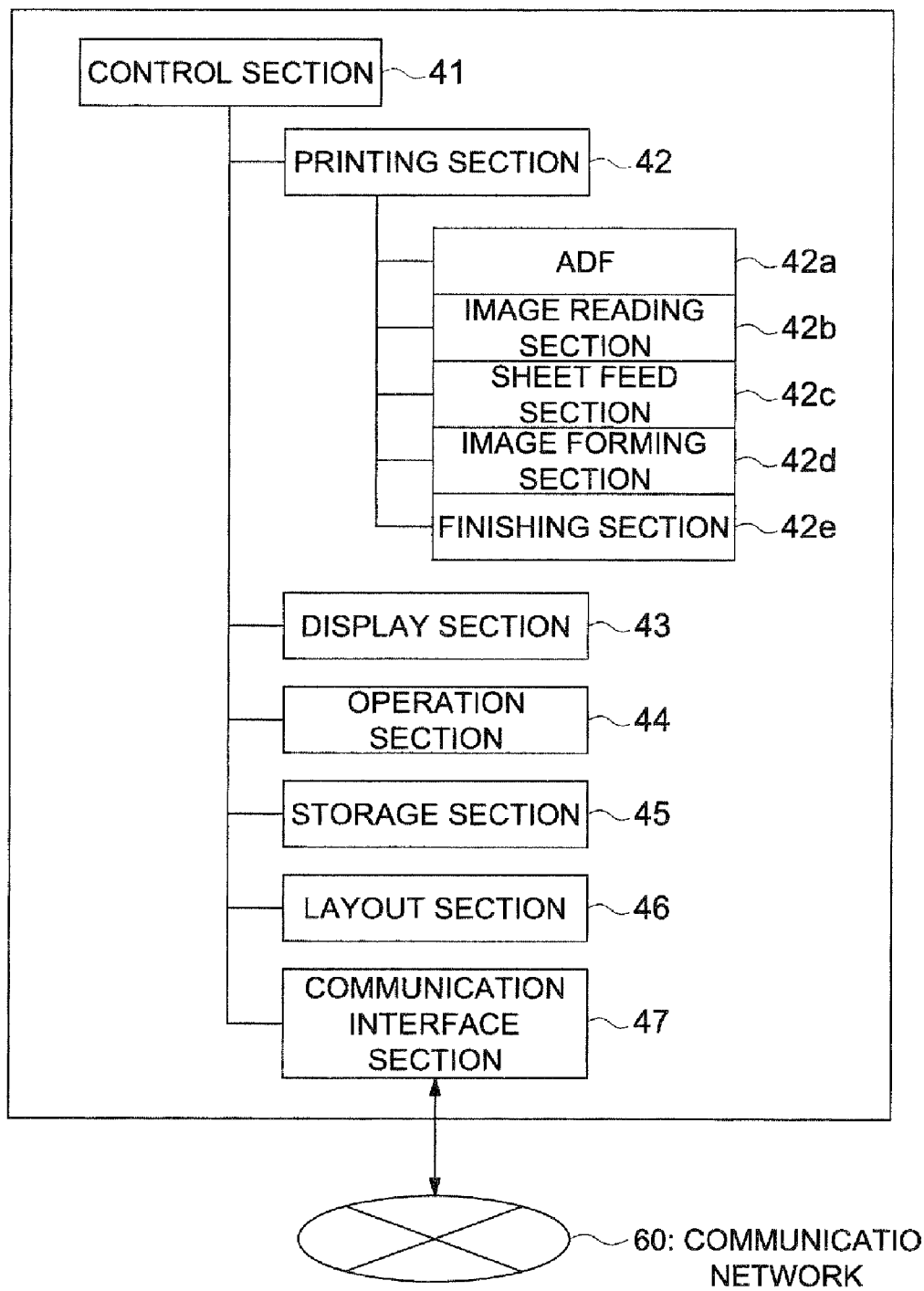
FIG. 3 is a block diagram representing the structure of the image forming apparatus in the first embodiment of the present invention.
Figure 4:
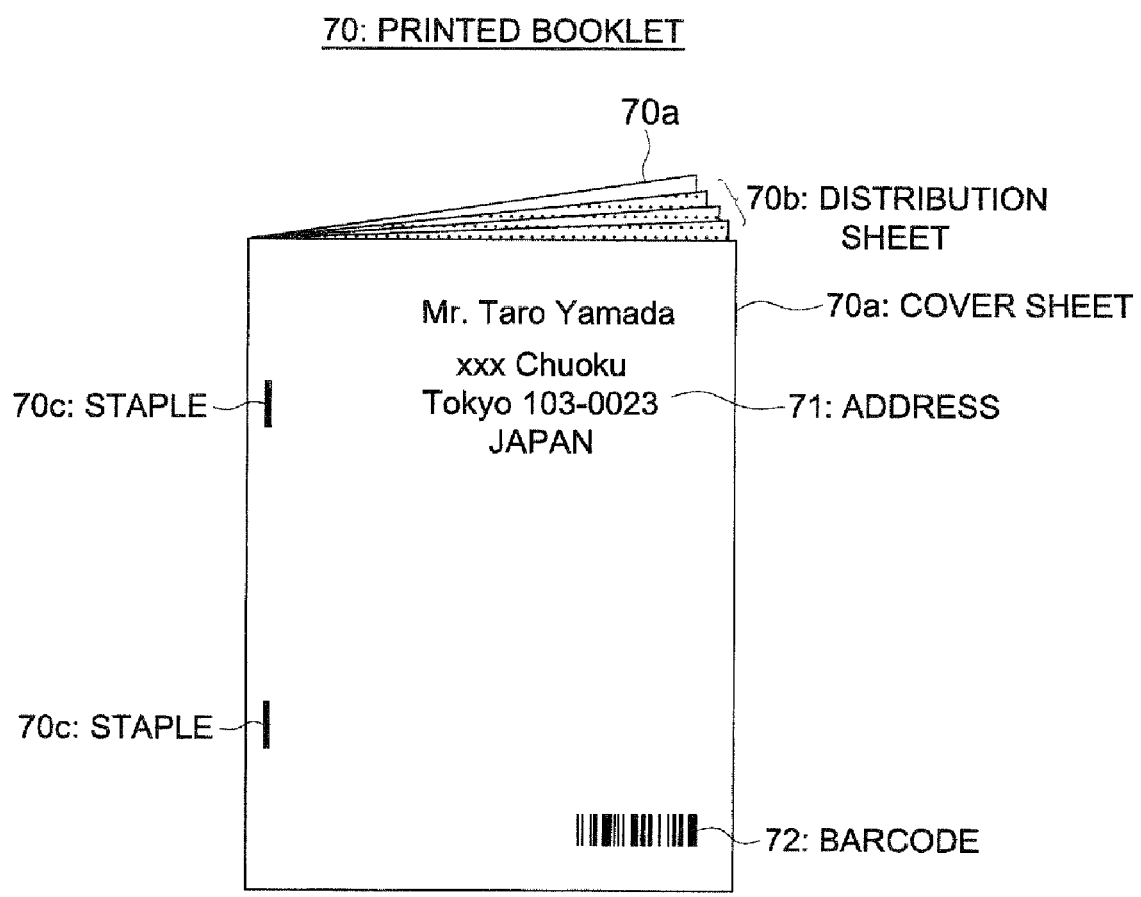
FIG. 4 is a diagram representing an embodiment of the structure of the printed booklet in the first embodiment of the present invention.
Figure 9:
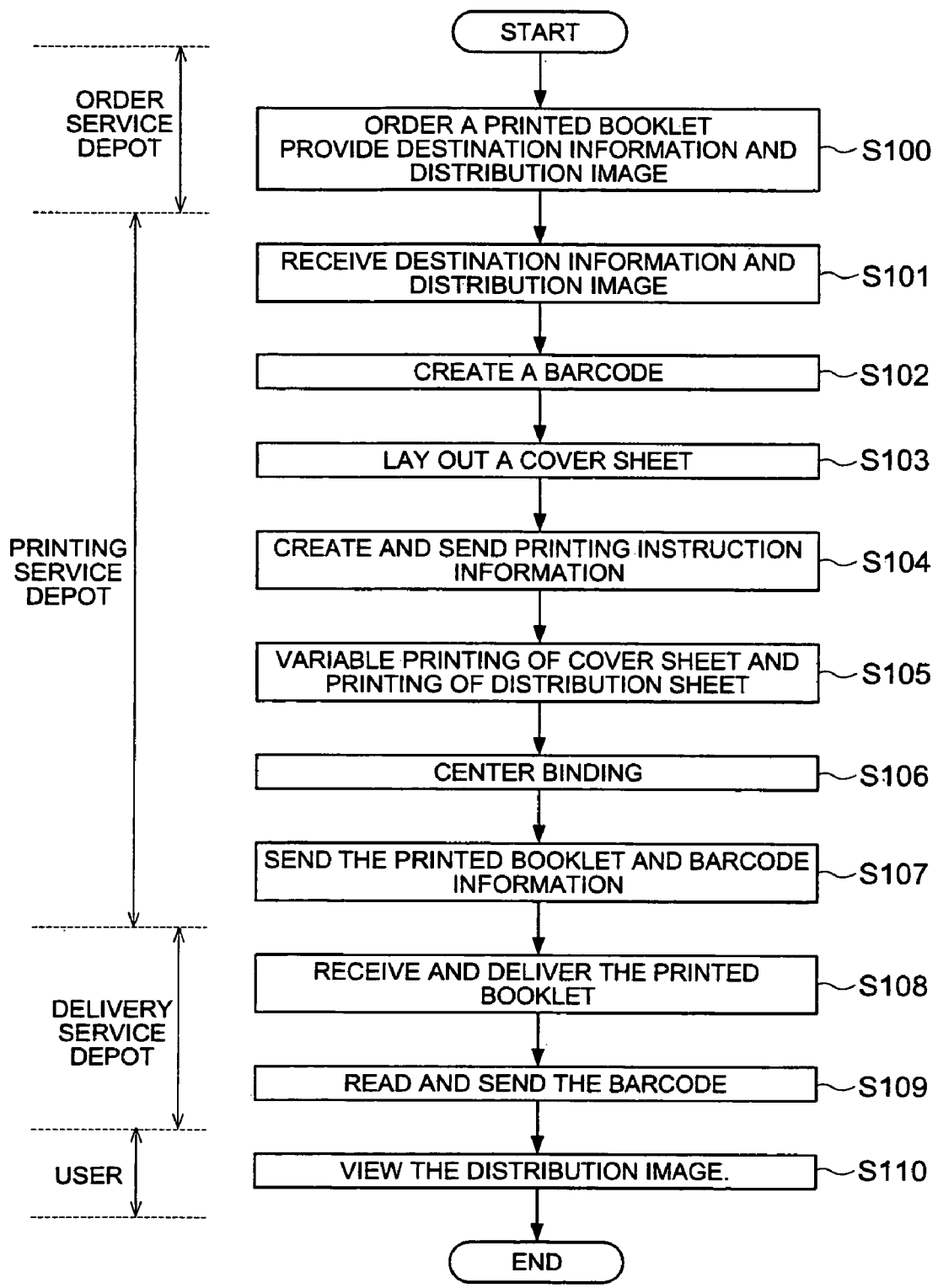
FIG. 9 is a flow chart showing the procedure of supplying a user with the printed booklet in the first embodiment of the present invention.

To illustrate greater details of the aforementioned embodiment of the present invention, the following describes printing system and printing method in the first embodiment of the present invention, with reference to FIGS. 1 through 9. FIG. 1 is a drawing schematically representing the structure of the printing system in the first embodiment of the present invention. FIG. 3 is a block diagram representing the structure of the image forming apparatus. FIG. 2 is a block diagram representing the structure of the order management terminal. FIG. 4 is a diagram representing an example of the structure of the printed booklet. FIG. 5 to FIG. 8 are drawings schematically representing the printed booklet creation procedure. FIG. 9 is a flow chart showing the procedure of supplying a user with the printed booklet.

As shown in FIG. 1, the printing system 10 of the present embodiment includes:

one or a plurality of order service depots for requesting a direct mail or the like;

one or a plurality of printing service depots for creating a printed booklet 70 produced by integration between a cover sheet printed with at least an address, and a recording sheet (hereinafter referred to as "distribution sheet") printed with information such as an image and text (hereinafter referred to as "distribution image information") for notification to a plurality of users as exemplified by an advertisement, notice or disclosure; and a plurality of delivery service depots wherein the printed booklet 70 is delivered to each user.

The order service depot includes one or a plurality of servers 20 for storing the information on address or name (hereinafter referred to as "destination information") of a plurality of the users to which one or a plurality of distribution image informations and distribution sheets are to be sent. The printing service depot is provided with at least:

one or a plurality of order management terminals 30 that creates the barcode information used for delivery management of the printed booklet 70, and produces the information for instruction of printing (hereinafter referred to as "printing instruction information"), based on the destination information and the distribution image information obtained from the server 20 and the barcode information having been created; and one or a plurality of image forming apparatuses 40 for printing the printed booklet 70 according to the printing instruction information from the order management terminal 30. The delivery service depot is provided with at least one or a plurality of delivery management terminals 50 for delivery management using the barcode printed on the printed booklet 70. They are connected via communication network 60 such as the LAN (Local Area Network) or WAN (Wide Area Network).

In FIG. 1, the distribution image information and destination information are stored in one and the same server 20. However, it is also possible to make such arrangements that they are stored in different servers 20, or any information or the part thereof is stored in the order management terminal 30 or image forming apparatus 40. Further, in FIG. 1, the image forming apparatus 40 is connected to the communication network 60. However, it can be connected to the order management terminal 30.

As shown in FIG. 2, the order management terminal 30 includes:

a display section 32 for displaying the order management screen or print setting screen;

an operation section 33 for setting print conditions;

a storage section 34 for storing various forms of information or program;

a printing instruction section 35 containing a function of creating the aforementioned barcode, a function of creating the aforementioned printing instruction information, and a function of executing the layout for various forms of printing automatically or manually:

a communication interface section 36 for linkage with the communication network 60;

a control section 31 for controlling these operations made up of a CPU (Central Processing Unit), ROM (Read-only Memory) and RAM (Random-Access Memory).

The function for creating a barcode or printing instruction information can be provided in the printing instruction section 35 as hardware, or a control program can be designed so that the computer works as a printing instruction section 35 so that this control program runs on the control section 31.

As shown in FIG. 3, the image forming apparatus 40 includes a printing section 42 for executing printing;

a display section 43 for displaying various forms of information;

an operation section 44 for performing various forms of operation;

a storage section 45 for storing various forms of information and program;

a communication interface section 47 for linkage with the communication network 60; and a control section 41 made up of a CPU, ROM and RAM for controlling the aforementioned operations.

A layout section 46 can be provided when the layout for variable printing is implemented by the image forming apparatus 40.

The aforementioned printing section 42 is made up of an ADF (Auto Document Feeder) 42a, image reading section 42b, sheet feed section 42c, image forming section 42d and finishing section 42e.

The ADF 42a feeds one or a plurality of documents to an image reading section 42b automatically. The image reading section 42b reads the image data from the document platen. The sheet feed section 42c loads a printing medium and feeds the stored printing medium to the image forming section 42d. The image forming section 42d contains the components required for image formation using the image forming process such as using electrophotographic process or electrostatic recording method, the components being exemplified by an photoreceptor, transfer belt, fixing unit and various forms of conveyance belt. An image is formed from the image data read from the image reading section 42b, or printing instruction information received through the communication interface section 47. This image is sent to the finishing section 42e. The finishing section 42e allows the printing medium coming from the image forming section 42d to be subjected to a process of finishing (for example, stapling, center folding (folding the printing medium at the center) folding in three (folding the printing medium at positions divided into three approximately equal parts), edge cutting (cutting off the edge of the printing medium to a predetermined size) desired by the user. This printing medium is then sent out. FIG. 3 shows a commonly practiced arrangement of the image forming apparatus 40. When a printed booklet 70 is produced according to the printing instruction information, the ADF 42a and image reading section 42b is not always necessary.

Referring to the flow chart of FIG. 9, the following describes the operation procedure up to the delivery of a printed booklet 70 to a user, using the printing system 10 of the aforementioned structure.

In Step S100, a client sends the destination information and distribution image information stored in the server 20 to the order management terminal 30, and sends a request to produce a printed booklet 70. There is no particular restriction to the method of providing the aforementioned information. Information can be supplied through a communication network 60, or a recording medium containing the aforementioned information can be provided. As shown in FIG. 19, the destination information comprises order management numbers, names, addresses, telephone numbers, individual information such as mail addresses and order dates and is formed as a list for each destination.

In Step S101, the order management terminal 30 receives the destination information and the distribution image information through the communication interface section 36 and stores the destination information in storage section 34. The order management numbers and the dates included in the lists of the destination information can be generated at the order management terminal on receiving an order of printing.

In Step S102, the printing instruction section 35 of the order management terminal 30 creates a barcode for delivery management of each printed booklet 70. There is no particular restriction to information recorded on this barcode if the information recorded on this barcode can be used at a delivery service depot and includes at least the order management numbers. Further, there is no particular restriction to the format of the barcode. It can be a barcode made up of a bar arrangement, or a QR code (registered trademark) with dots arranged thereon. Further, the barcode is not essential. When only the addresses are printed on the cover sheet, this Step can be omitted.

In Step S103, the printing instruction section 35 provides layout for the cover sheet of the individual printed booklet 70. To put it more specifically, the information such as an address, barcode and advertisements is laid out at the predetermined position of the cover sheet and is displayed on the display section 32. The operator at the printing service depot corrects the layout of individual information using an operation section 33, wherever required. This layout can be provided by the printing instruction section 35 automatically or by the operator manually. When the image forming apparatus 40 is utilized, this step can be omitted. Further, there is no particular restriction to the arrangement of individual information, except when a strip of paper for binding (to be described later) is used, then the layout is preferred provided so as to avoid overlapping with this strip of paper. For example, as shown in FIG. 4, the address 71 can be laid out on the upper right corner of the cover sheet 70a, and the barcode 72 on the lower right corner of the cover sheet 70a.

In Step S104, the operator at a printing service depot sets the type and size of the printing medium, the order of printing and the printing method using the printing instruction screen displayed on the display section 32 when needed. Based on at least the destination information, barcode information, distribution image information, layout information and the aforementioned setting information, the printing instruction section 35 creates the printing instruction information (data described in PDL (Page Description Language) such as PDF (Portable Document Format) data, PS (Post Script) and PCL (Printer Control Language) required for printing the printed booklet 70 for each address to the image forming apparatus 40.

The embodiment shows a form of forming printed booklets for different destinations at once at the image forming apparatus 40 by one time sending of the printing instruction information. Therefore the printing instruction information includes information of a plurality of destinations. In the embodiment, the one time sending of the distribution image information can shorten the time from receiving order to completing forming the printed booklets. Also the printing instruction information for each destination can be formed sequentially and be sent to the image forming apparatus 40.

Based on the printing instruction information, the image forming apparatus 40 prints printed booklets 70 for each address. To put it more specifically, in Step S105, based on other information such as destination information, barcode information and advertisements, the image forming section 42d prints a cover sheet. This is followed by the step of printing a distribution sheet according to the distribution image information. These series of printing operations are repeated for all the addresses. In this case, the control section 41 monitors the sheet feed error and controls the printing section 42 to ensure that the cover sheet and distribution sheet are printed in correct sequence. It should be noted that there is no particular restriction to the method of printing the cover sheet and distribution sheet. To eliminate the possibility of wasting a printing medium, printing is preferably applied to both faces of the distribution sheet.

Figure 5:
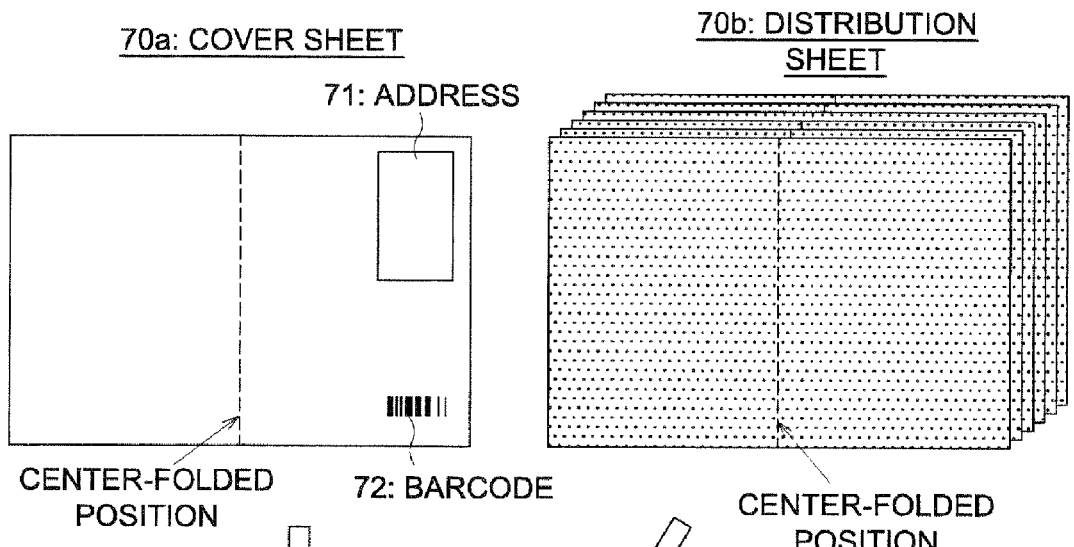
FIG. 5(a), FIG. 5(b), FIG. 5(c) and FIG. 5(d) together represent a drawing schematically representing the printed booklet creation procedure in the first embodiment of the present invention.
Figure 5:
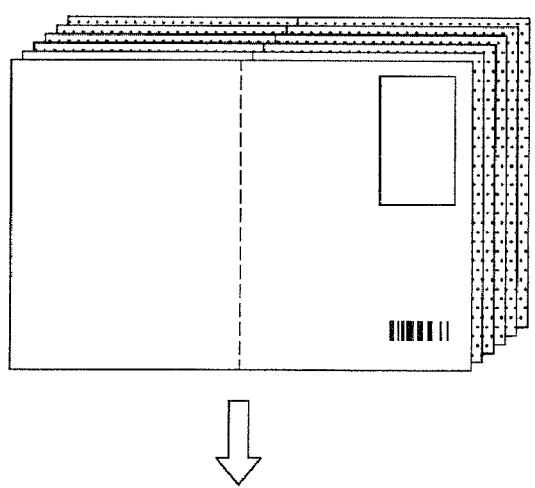
Figure 5:
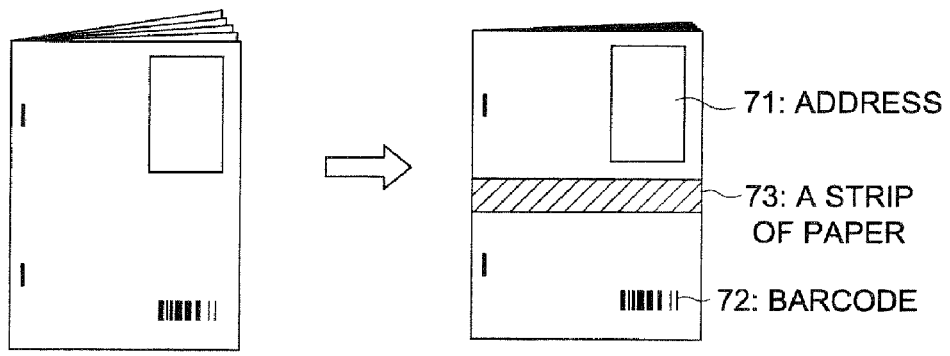

In Step S106, the finishing section 42e applies to the cover sheet and distribution sheet for each address a process of finishing such as stapling, center folding, folding in three and edge cutting, whereby a printed booklet 70 is produced. The aforementioned procedure of producing a printed booklet 70 is schematically shown in FIG. 5. The cover sheet 70a with address 71 and barcode 72 arranged thereon and the distribution sheet 70b having the distribution image information arranged thereon are printed sequentially for each address (FIG. 5(a)). They are overlapped one on top of another (FIG. 5(b)), and are folded at the center-folded position so that the address 71 and barcode 72 will face the front. If required, stitching (stapled in this case) is applied to the position close to the folded position. This provides an integrally bound printed booklet 70 (FIGS. 4 and 5(c)).

Figure 6A:
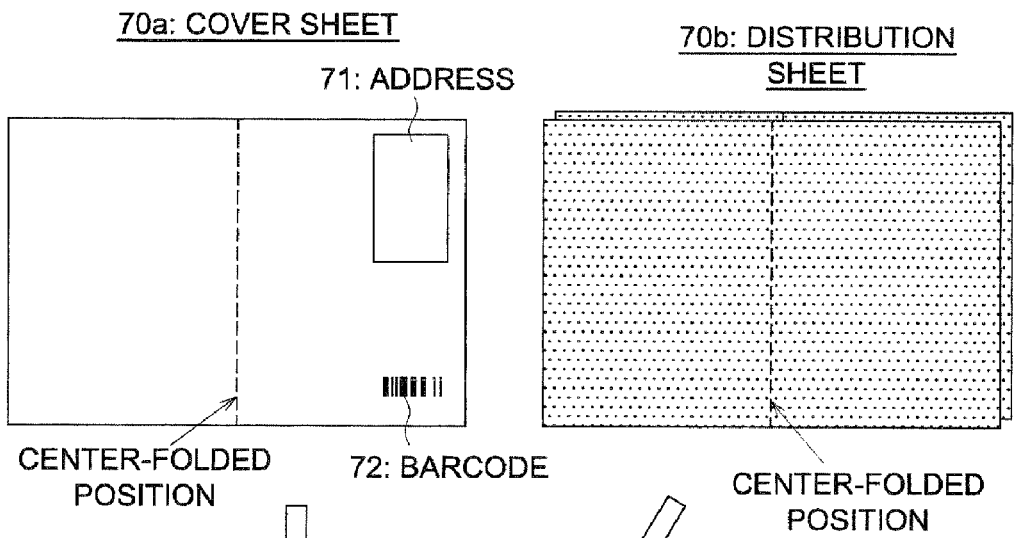
FIG. 6(a), FIG. 6(b), FIG. 6(c) and FIG. 6(d) together represent a drawing schematically representing the printed booklet creation procedure in the first embodiment of the present invention.
Figure 6B:
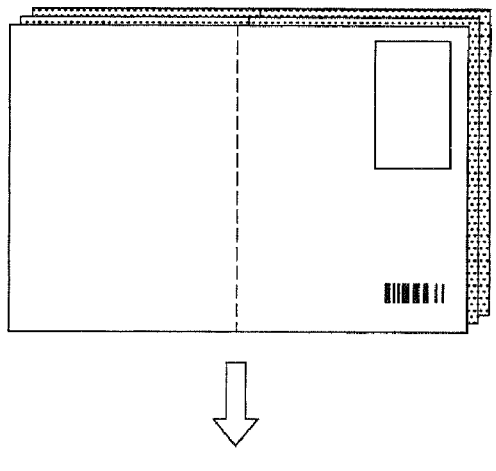
Figures 6C, 6D:
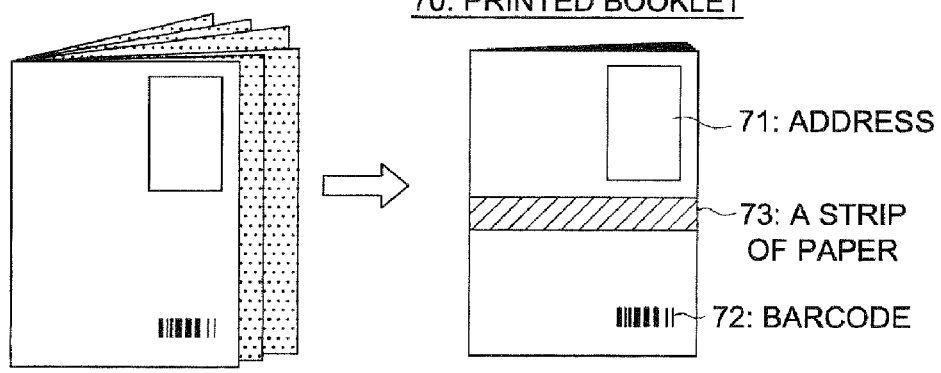
Figure 7:
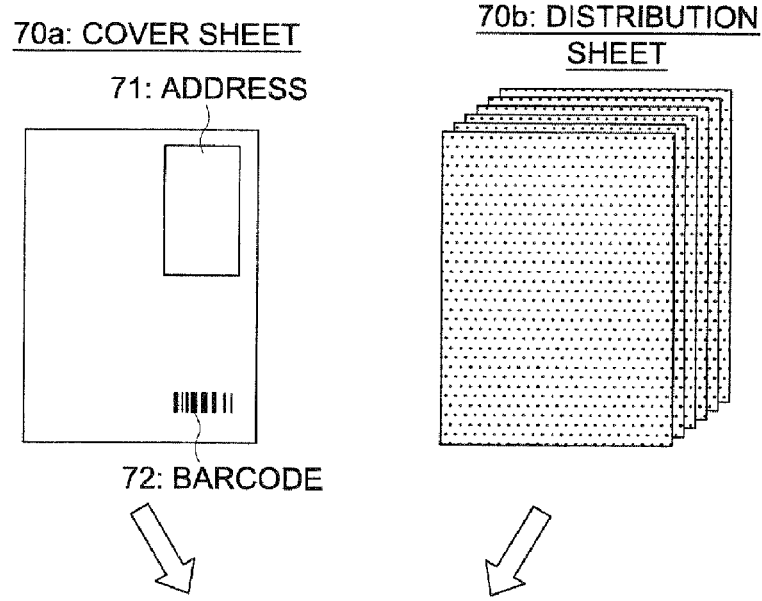
FIG. 7(a), FIG. 7(b) and FIG. 7(c) together represent a drawing schematically representing the printed booklet creation procedure in the first embodiment of the present invention.
Figure 7:
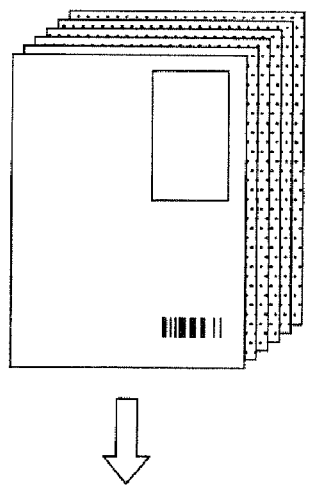
Figure 7:
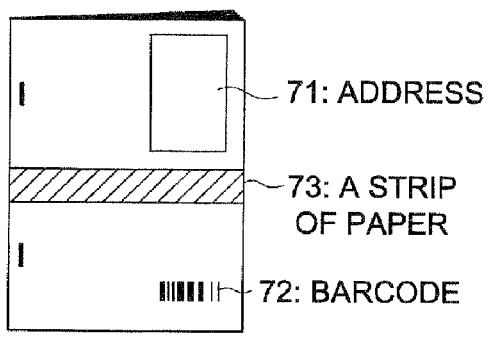

FIGS. 4 and 5 show an example wherein the cover sheet 70a is printed with the address 71 and barcode 72 alone. Other information such as advertisements can be printed on the outer or inner surface of the cover sheet 70a or the back cover. In this embodiment, since the cover sheet 70a and distribution sheet 70b are printed in an integrated manner, various forms of control can be applied. For example, stitching is not always necessary when there are a smaller number of the printed matters. Thus, the control section 41 determines the method of finishing based on the number of sheets to be printed in the printed booklet 70. As shown in FIG. 6, only the process of center folding can be applied when there are a smaller number of sheets to be printed. Further, when the distribution image information runs to an odd number of pages, an excess page will occur. The control section 41 reads out another image stored in the storage section 45, and this image is printed on the excess page. In FIG. 5, the cover sheet 70a and distribution sheet 70b are center-folded. However, the cover sheet 70a and distribution sheet 70b can be stitched without being center-folded, as shown in FIG. 7.

In Step S107, the printed booklet 70 having been produced is held in a strip of paper 73, as shown in FIG. 5(d). There is no particular restriction to form of this strip of paper 73. It can be made of paper which can be easily broken, or a transparent vinyl sheet. When a transparent member is used, the address 71 and barcode 72 can be laid out at a desired position of the cover sheet 70a. When the cover sheet 70a and distribution sheet 70b are secured by stapling or the like, use of a strip of paper 73 can be omitted. After that, a plurality of printed booklets 70 are sent to the delivery service depot. Using the order management terminal 30, the operator of the printing service depot sends to the delivery management terminal 50 the information such as barcode information that can be used at the delivery service depot.

In this embodiment, processes from printing through finishing are implemented in an integrated manner. This arrangement permits various forms of control. As shown in FIG. 8, for example, the size of the cover sheet 70a is made greater than that of the distribution sheet 70b, and one end of the cover sheet 70a is made to come off the edge at the time of center folding. The portion coming off the edge is folded and glued so the printed booklet 70 does not open.

In Step S108, the delivery service depot having received the printed booklet 70 loads the printed booklet 70 on a delivery cart for each predetermined area, and delivers each printed booklet 70 to the user identified by the address 71. In Step S109, using the terminal provided with a barcode reader 51, the personnel in charge of delivery reads the barcode 72 of the printed booklet 70, and sends the barcode information to the delivery management terminal 50 of the delivery service depot. The delivery management terminal 50 manages the delivery status of the printed booklet 70 by comparison between the barcode information sent from the terminal and the barcode information sent from the order management terminal 30.

In Step S110, upon receipt of the printed booklet 70, the user removes a strip of paper 73, and views the distribution image information printed on the distribution sheet 70b of the printed booklet 70.

As described above, a printed booklet 70 is produced by integration between the cover sheet 70a and distribution sheet 70b. Thus, the printing service depot need not perform the work of combining the cover sheet 70a with the distribution sheet 70b or the work of putting them into envelopes. The delivery service depot need not perform the work of creating a barcode label or the work of bonding it on an envelope. Further, such a member as an envelope need not be used. Thus, the printing cost and the number of production steps are reduced. Further, in this embodiment, the printed booklet 70 per se is printed with an address 71. This allows the owner of the printed booklet 70 to be identified. For example, when one printed booklet 70 has been be read by several persons, it can be correctly returned to the owner of the printed booklet 70.

[Embodiment 2]

Figure 10:
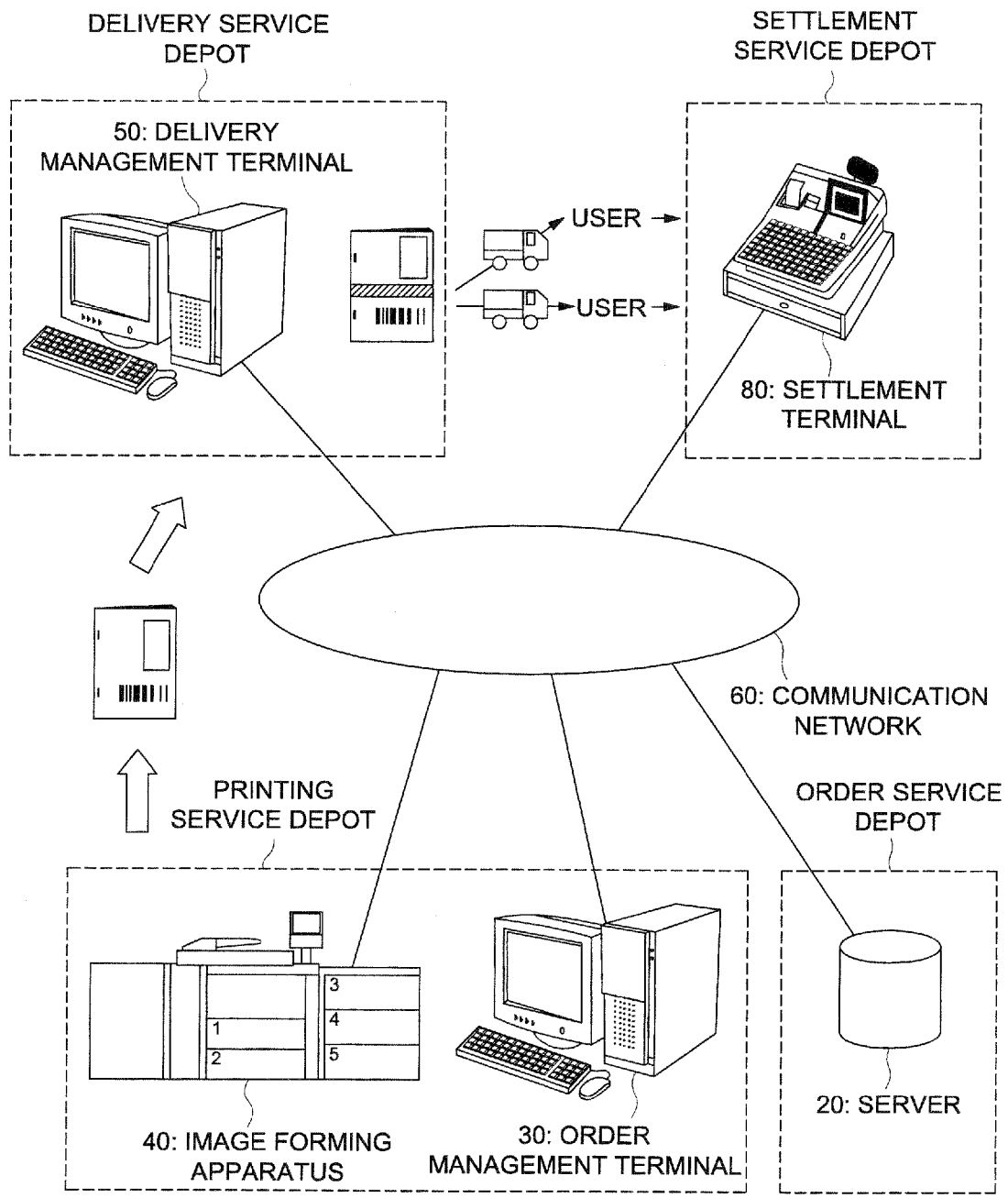
FIG. 10 is a drawing schematically representing the structure of the printing system in the second embodiment of the present invention.
Figure 11:
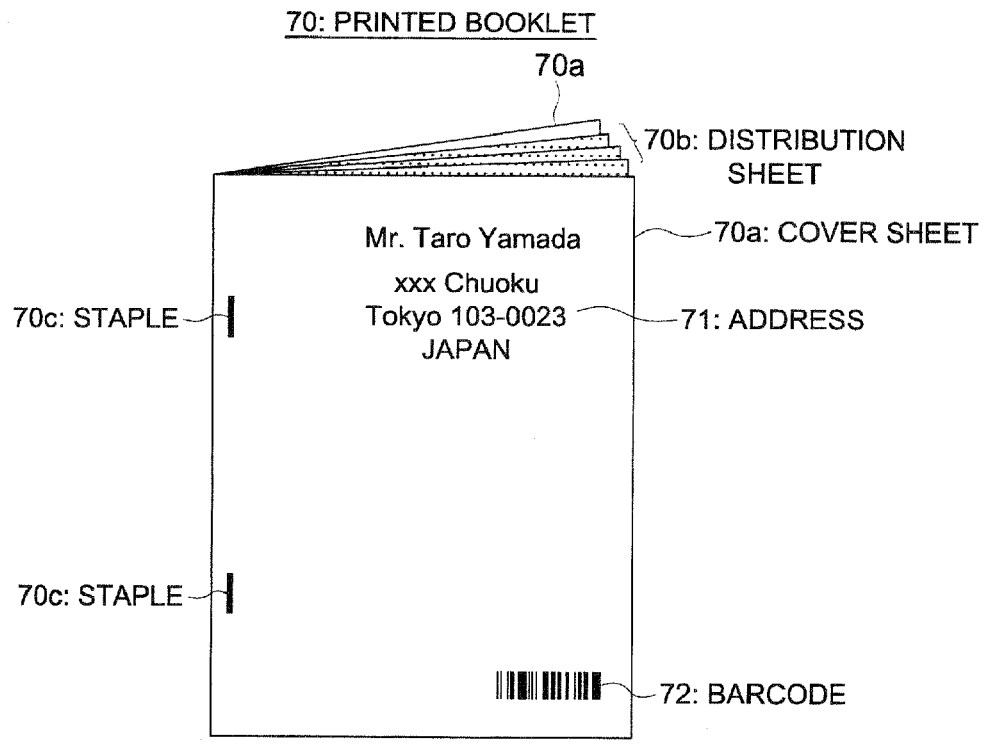
FIG. 11(a) and FIG. 11(b) are diagrams representing an example of the structure of the printed booklet in the second embodiment of the present invention.
Figure 11:
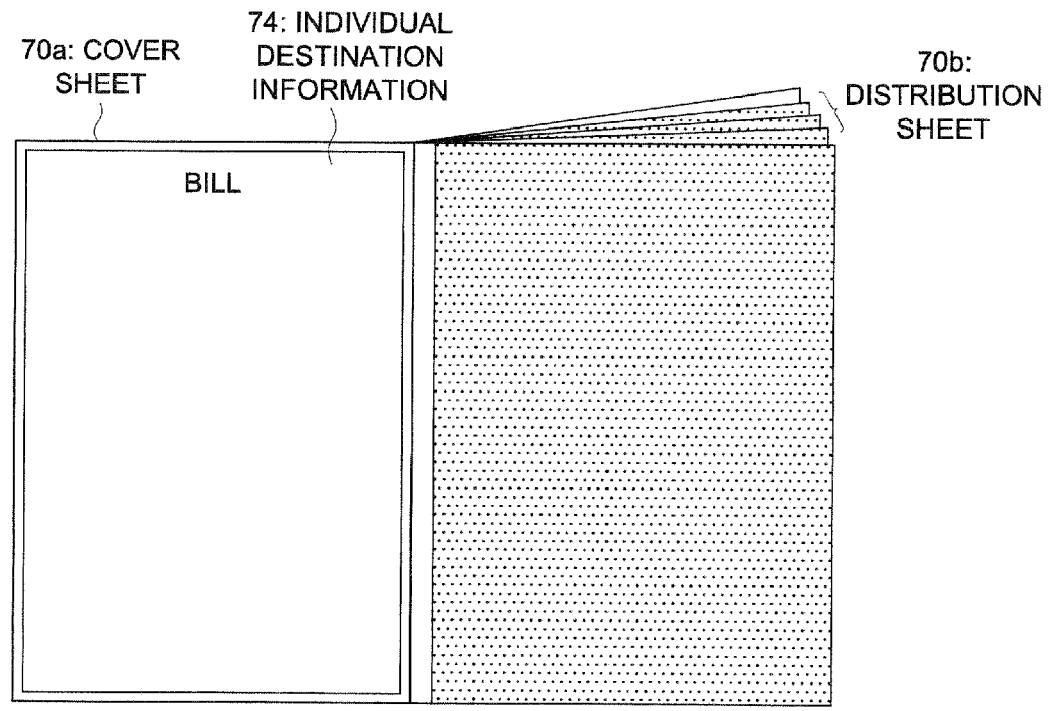
Figure 12:
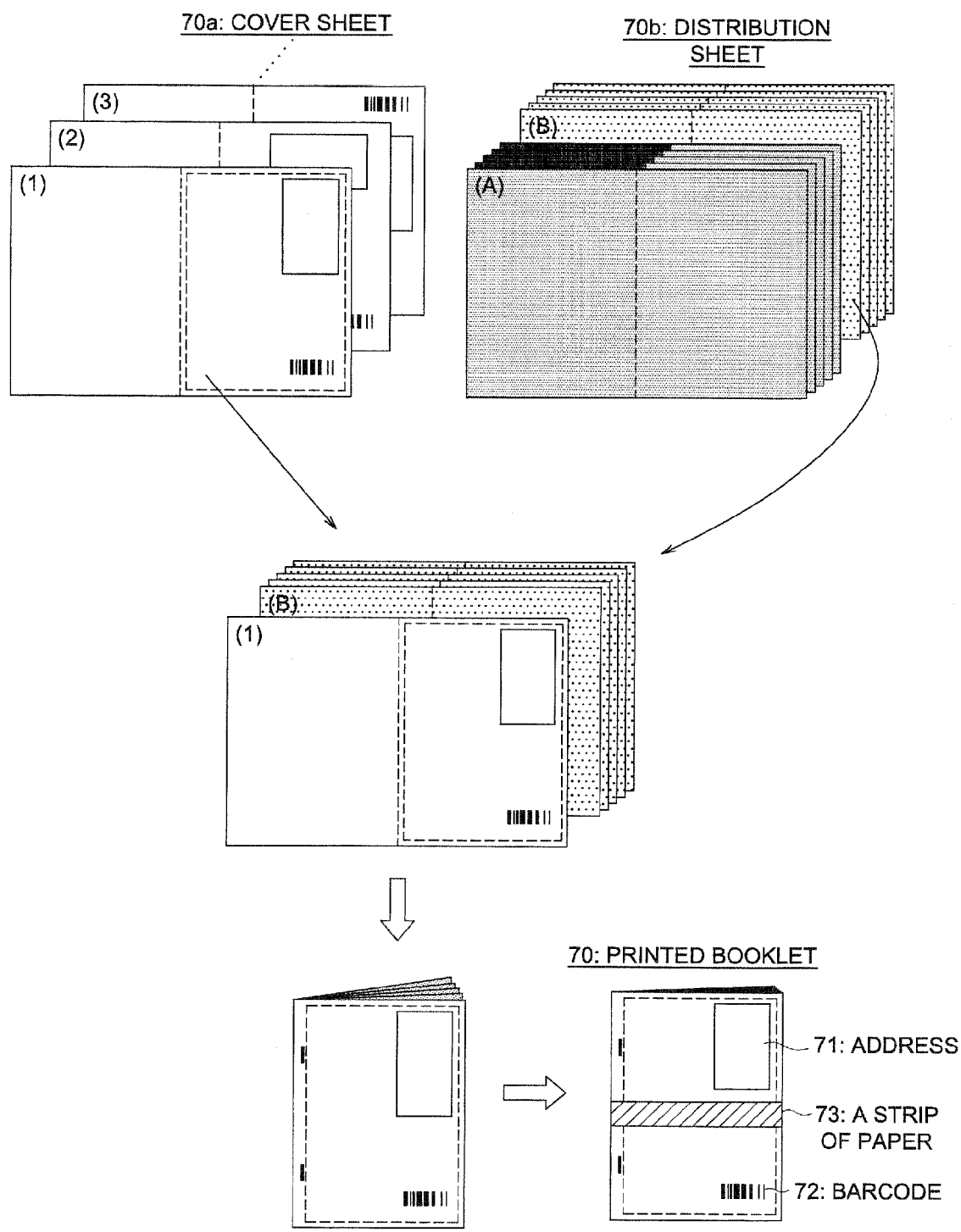
FIG. 12 is a drawing schematically representing the printed booklet creation procedure in the second embodiment of the present invention.
Figure 13:
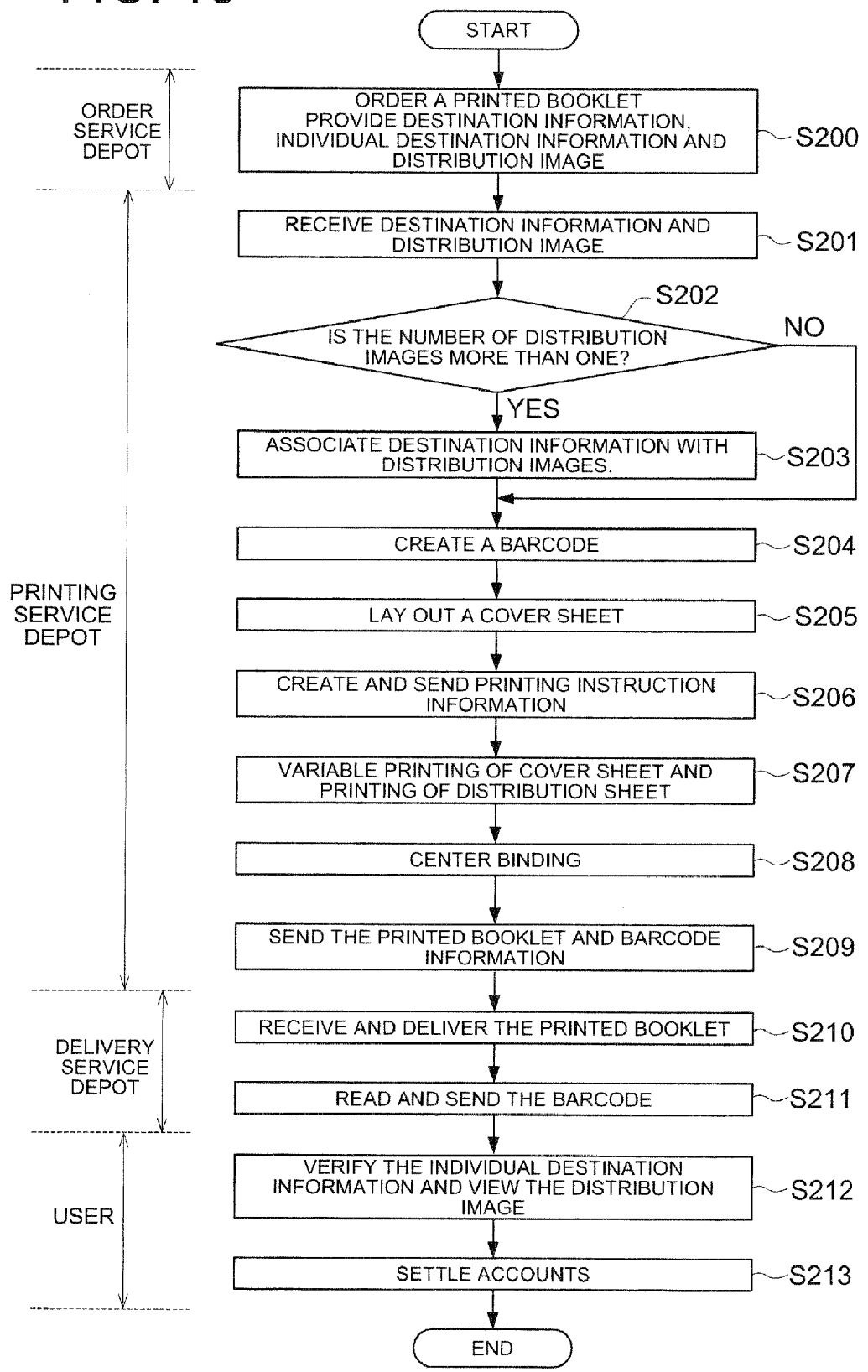
FIG. 13 is a flow chart showing the procedure of supplying a user with the printed booklet in the second embodiment of the present invention, and settlement of accounts by the user.

Referring to FIGS. 10 through 13, the following describes the printed booklet, image forming apparatus, control program, printing system and printing method in the second embodiment of the present invention: FIG. 10 is a drawing schematically representing the structure of the printing system in this embodiment. FIG. 11 is a diagram representing an example of the structure of the printed booklet. FIG. 12 is a drawing schematically representing the printed booklet creation procedure. FIG. 13 is a flow chart showing the procedure of supplying a user with the printed booklet, and settlement of accounts by the user.

In the aforementioned first embodiment, the cover sheet 70a is printed with the address 71, barcode 72, advertisements and other information. Such information as a bill to be notified to the individual user identified by the address 71 (hereinafter referred to as "individual destination information") together with the distribution image information such as an advertisement may be delivered by direct mail. Thus, this embodiment will be discussed with reference to the cases wherein the cover sheet is printed with the individual destination information.

As shown in FIG. 10, the printing system 10 of this embodiment includes:

one or a plurality of order service depots that request direct mailing of an individual destination information such as a bill, and a distribution image information;

one or a plurality of printing service depot for producing a printed booklet 70 made up of integration of the cover sheet containing an address, barcode and individual destination information and the distribution sheet containing a distribution image information;

one or a plurality of delivery service depots that deliver the printed booklet 70 to each user; and one or a plurality of settlement service depots for settling accounts using the printed booklet 70.

The order service depot one or a plurality of servers 20 that store at least destination information, distribution image information and individual destination information. Further, the printing service depot includes one or a plurality of order management terminals 30 that create barcodes used for delivery of the printed booklet 70 and manage the settlement and that create printing instruction information, based on the destination information, distribution image information, individual destination information and barcode information; and one or a plurality of image forming apparatuses 40 that print a printed booklet 70 in response to the printing instruction information from the order management terminal 30. Further, the delivery service depot contains at least one or a plurality of delivery management terminals 50 that provides delivery management using the barcode printed on the printed booklet 70. The settlement service depot contains one or a plurality of settlement terminal 80 for settling accounts based on the individual destination information printed on the printed booklet 70. They are linked via the communication network 60 such as the LAN or WAN.

In FIG. 10, the distribution image information, destination information and individual destination information are stored in one and the same server 20. However, it is also possible to make such arrangements that they are stored in different servers 20, or any information or the part thereof is stored in the order management terminal 30 or image forming apparatus 40. The structure of the aforementioned order management terminal 30 and image forming apparatus 40 is the same as that of the first embodiment, and will not be described to avoid duplication.

Referring to the flowchart of FIG. 13, the following describes the procedure wherein the printed booklet 70 is delivered to the user using the printing system 10 of the aforementioned structure and settlement of accounts is made by the user.

In Step S200, the client sends the destination information, distribution image information and individual destination information stored in the server 20 to the order management terminal 30, and requests a printed booklet 70 to be printed. When the individual destination information and distribution image information are sent under the same cover, the details of the distribution image information may vary according to each user. Accordingly, a plurality of distribution image informations can be sent. In this case, it is preferred to send association information that associates the distribution image informations to be sent, with users. FIG. 20 is an example of destination information in the second embodiment of the present invention. The destination information comprises order management numbers, names, addresses, telephone numbers, individual information such as mail addresses, order dates and image identification information (image ID) as association information that associates destinations with the distribution image information, and is formed as a list for each destination.

Then in Step S201, the order management terminal 30 receives the destination information, the distribution image information and individual destination information through the communication interface section 36 and stores the destination information in storage section 34. The order management numbers and the dates included in the lists of the destination information can be generated at the order management terminal upon receiving an order of printing.

In Step S202, the printing instruction section 35 of the order management terminal 30 determines if there are more than one distribution image information or not. If there is more than one, the printing instruction section 35 refers to the aforementioned association information in Step S203, and determines association between the user destination information and distribution image information. This association can also be used in the aforementioned first embodiment.

In Step S204, the printing instruction section 35 of the order management terminal 30 produces a barcode for delivery management of each printed booklet 70 and settlement management. There is no particular restriction to the information recorded on this barcode if the information recorded on this barcode can be used at the delivery service depot, settlement service depot or order service depot and includes at least the order management numbers. Further, there is no particular restriction to the form of the barcode. This step can be omitted when the cover sheet is printed with an address and individual destination information only.

In Step S205, the printing instruction section 35 determines the cover sheet of each printed booklet 70. To put it more specifically, other information such as the address, barcode, individual destination information and advertisement is laid out at a predetermined position of the cover sheet and is displayed on the display section 32. Wherever required, the operator at the printing service depot corrects the layout of the information using the operation section 33. This layout can be provided automatically by the printing instruction section 35, or manually by the operator. When the image forming apparatus 40 is used, this step can be omitted. Although there is no particular restriction to the layout of information, the address or barcode is preferably laid out so that it will not overlap with a strip of paper, as shown in FIG. 11. The individual destination information is preferably laid out on the inner face of the cover sheet 70a or the back cover so that it will not be revealed to a third party.

In Step S206, using the printing instruction screen indicated on the display section 32, the operator of the printing service depot sets such printing conditions as the type and size of the printing medium, and the order of printing and printing method. According to the destination information, barcode information, individual destination information, distribution image information, layout information and the aforementioned setting information, the printing instruction section 35 creates the printing instruction information that allows the image forming apparatus 40 to print the printed booklet 70 for each address and sends it to the image forming apparatus 40.

In the embodiment, the printing instruction information for each destination is formed separately, is sent to the image forming apparatus 40 and the printed booklets are formed sequentially for each destination according to the printing instruction information at the image forming apparatus 40 as it is likely that each destination includes different distribution image information. And also like in the embodiment 1, the image instruction information having a plurality of destinations can be formed and be sent to the image forming apparatus 40 and the printed booklets for different destinations can be formed at once. Therefore the printing instruction information includes information of a plurality of destinations. In such a case, the printed booklets for each destination can be formed through associating each destination with the distribution image information at the image forming apparatus 40.

Then the image forming apparatus 40 prints sequentially the printed booklet 70 for each destination according to the printing instruction information for each destination. To put it more specifically, in Step S207, the image forming section 42d prints the cover sheet, based on other information such as destination information, barcode information, individual destination information and advertisement. This is followed by the step of printing the distribution sheet based on the distribution image information associated with the individual destination information. These series of printing operations are repeated for all the addresses. In this case, the control section 41 monitors the sheet feed error and controls the printing section 42 to ensure that the cover sheet and distribution sheet are printed in correct sequence. It should be noted that there is no particular restriction to the method of printing the cover sheet and distribution sheet. To eliminate the possibility of wasting a printing medium, printing is preferably applied to both faces of the cover sheet and distribution sheet.

In Step S208, the finishing section 42e applies a process of finishing such as stapling, center folding, folding in three and edge cutting to the cover sheet and distribution sheet for each address, whereby a printed booklet 70 is produced. The aforementioned procedure of producing a printed booklet 70 is schematically shown in FIG. 12. The cover sheet 70a with the address 71 and barcode 72 arranged on the outer surface for each address and the individual destination information 74 arranged on the inner surface (cover sheet of FIG. 11(a) in this case) and the distribution sheet 70b associated with the address 71 (distribution sheet of FIG. 11(b) in this case) are printed sequentially (FIG. 11(a)). They are overlapped with each other (FIG. 11(b)) and are folded at the center folding position so that the address 71 and barcode 72 face the front. If required, stitching (stapled in this case) is applied to the position close to the folded position. This provides an integrally bound printed booklet 70 (FIG. 10 and FIG. 12).

In this embodiment as well, the cover sheet 70a and distribution sheet 70b are printed in an integrated manner. Accordingly, various forms of control can be applied. When the distribution image information runs to an odd number of pages, another image stored in the storage section 45 can be printed on the excess page. Further, the cover sheet 70a and distribution sheet 70b can be stitched without being center-folded, as shown in FIG. 7.

In Step S209, as shown in FIG. 11(d), a strip of paper 73 is applied to the printed booklet 70 having been produced. In the embodiment as well, there is no particular restriction to the form of the strip of paper 73. It can be made of paper which can be easily broken, or a transparent vinyl sheet. When a transparent member is used, the address 71 and barcode 72 can be laid out at a desired position of the cover sheet 70a. When the cover sheet 70a and distribution sheet 70b are secured by stapling or the like, use of a strip of paper 73 can be omitted. It is also possible to make such arrangements that the size of the cover sheet 70a is made greater than that of the distribution sheet 70b so that one end of the cover sheet 70a will come off the edge at the time of center folding. Then opening of the printed booklet 70 can be prevented if the portion coming off the edge is folded and is glued. After that, a plurality of printed booklets 70 are sent to the delivery service depot. Using the order management terminal 30, the operator of the printing service depot sends to the delivery management terminal 50 the information such as barcode information that can be used at the delivery service depot and settlement service depot.

In Step S210, the delivery service depot having received the printed booklet 70 loads the printed booklet 70 onto the delivery cart for each predetermined area, and sends the printed booklet 70 to the user identified by the address 71. In Step S211, using the terminal provided with a barcode reader 51, the personnel in charge of delivery reads the barcode of the printed booklet 70, and sends the barcode information to the delivery management terminal 50 of the delivery service depot. The delivery management terminal 50 manages the delivery status of the printed booklet 70 by comparison between the barcode information sent from the terminal and the barcode information sent from the order management terminal 30.

In Step S212, upon receipt of the printed booklet 70, the user removes a strip of paper 73, and checks for the individual destination information of the printed booklet. In this case, the individual destination information is integral with the distribution image information. Without discarding only the distribution sheet 70b, the user necessarily watches the distribution image information after checking the individual destination information. Thus, the effect of advertisement can be enhanced.

In Step S213, when the individual destination information is a bill, the user brings the printed booklet 70 to the settlement service depot to settle his account. The settlement terminal 80 sends the settlement information to the server 20 and the client can check the current situation of the settlement of the bill account.

As described above, the printed booklet 70 produced is made of integration between the cover sheet 70a and distribution sheet 70b, and this arrangement cuts down the printing cost and number of operation steps. Further, in this embodiment, the cover sheet 70a of the printed booklet 70 is printed with the individual destination information 74. This enhances the possibility of the distribution sheet 70b of the printed booklet 70 being discarded, whereby the advertisement effect of the distribution sheet 70b is improved.

The aforementioned embodiment shows an example wherein the bill is printed on the cover sheet 70a. There is no particular restriction to the individual destination information if it identifies the user and give notification. This information is not necessarily restricted to the information that involves settlement of accounts.

[Embodiment 3]

Figure 14:
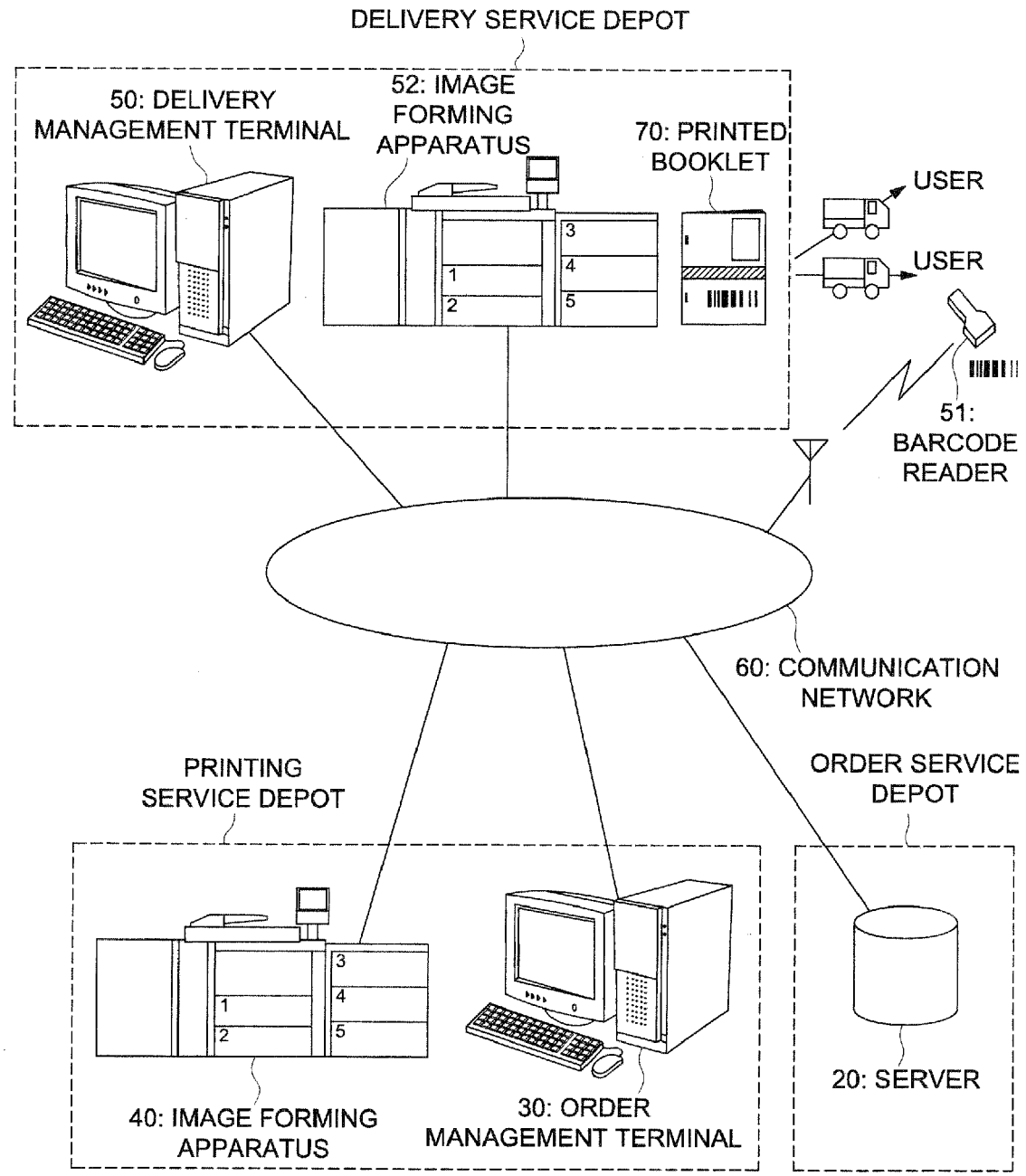
FIG. 14 is a drawing schematically representing the structure of the printing system in the third embodiment of the present invention.
Figure 15:
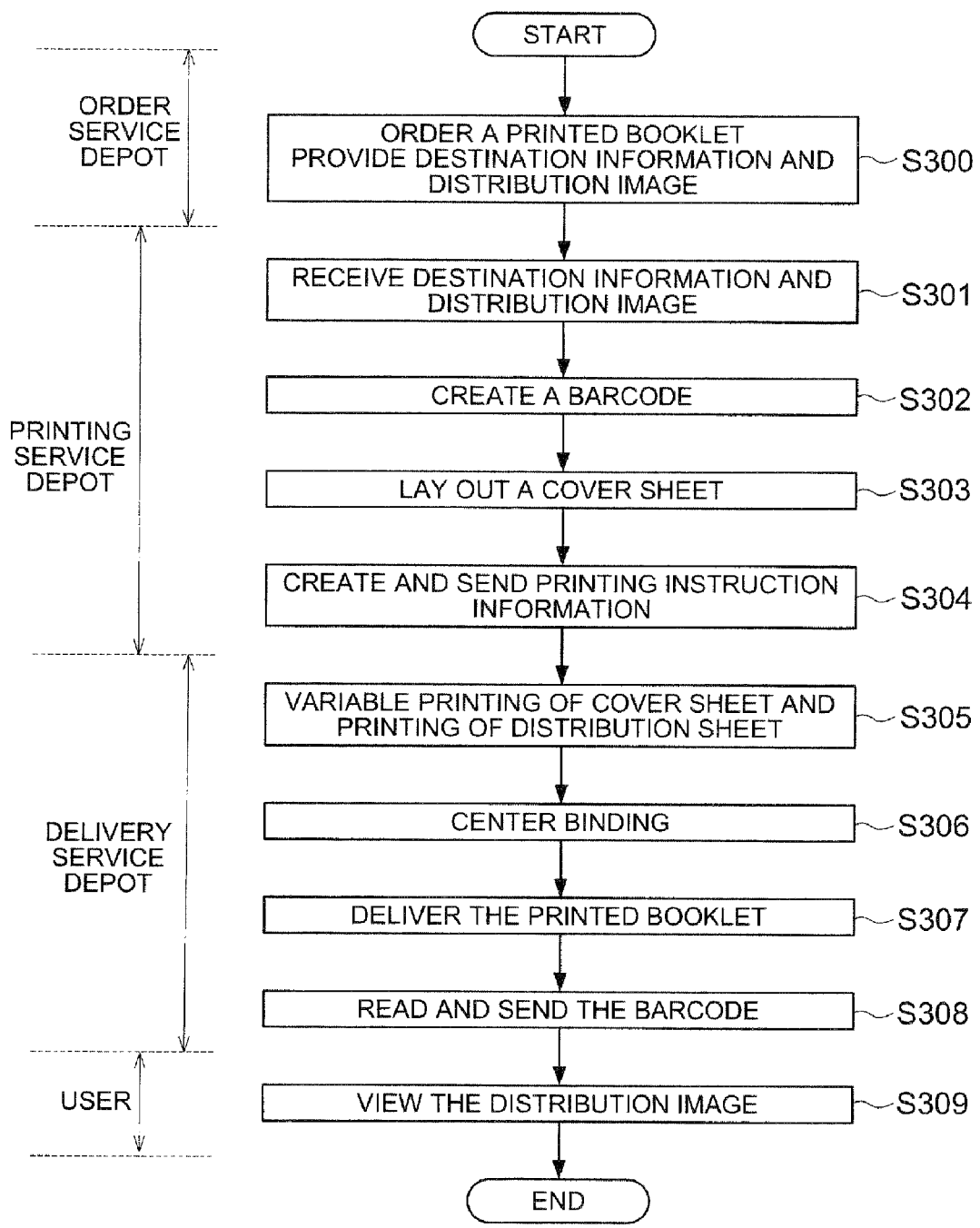
FIG. 15 is a flow chart showing the procedure of supplying a user with the printed booklet in the third embodiment of the present invention.
Figure 16:
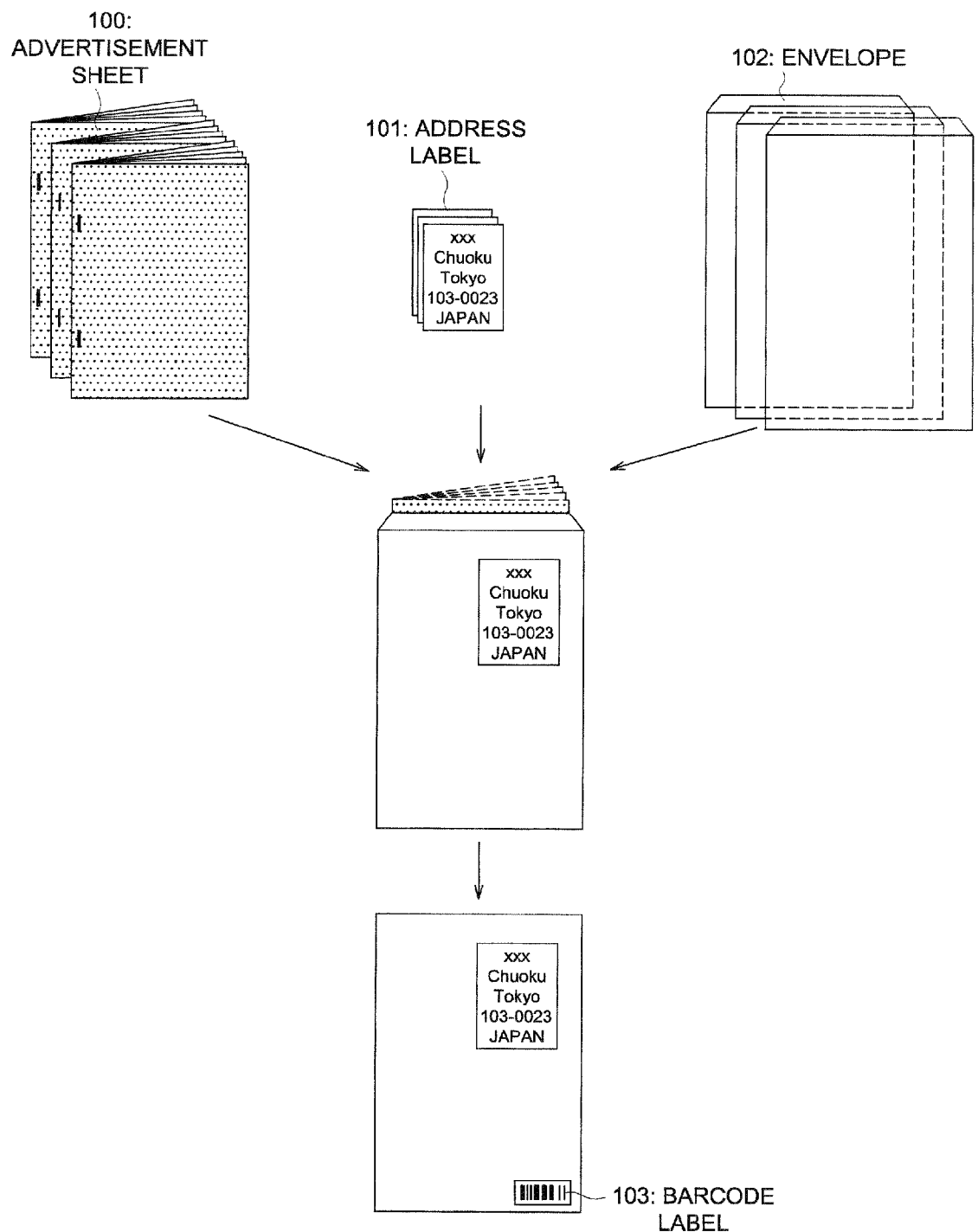
FIG. 16 is a drawing schematically representing a printed matter creation procedure in the first conventional example.
Figure 17:
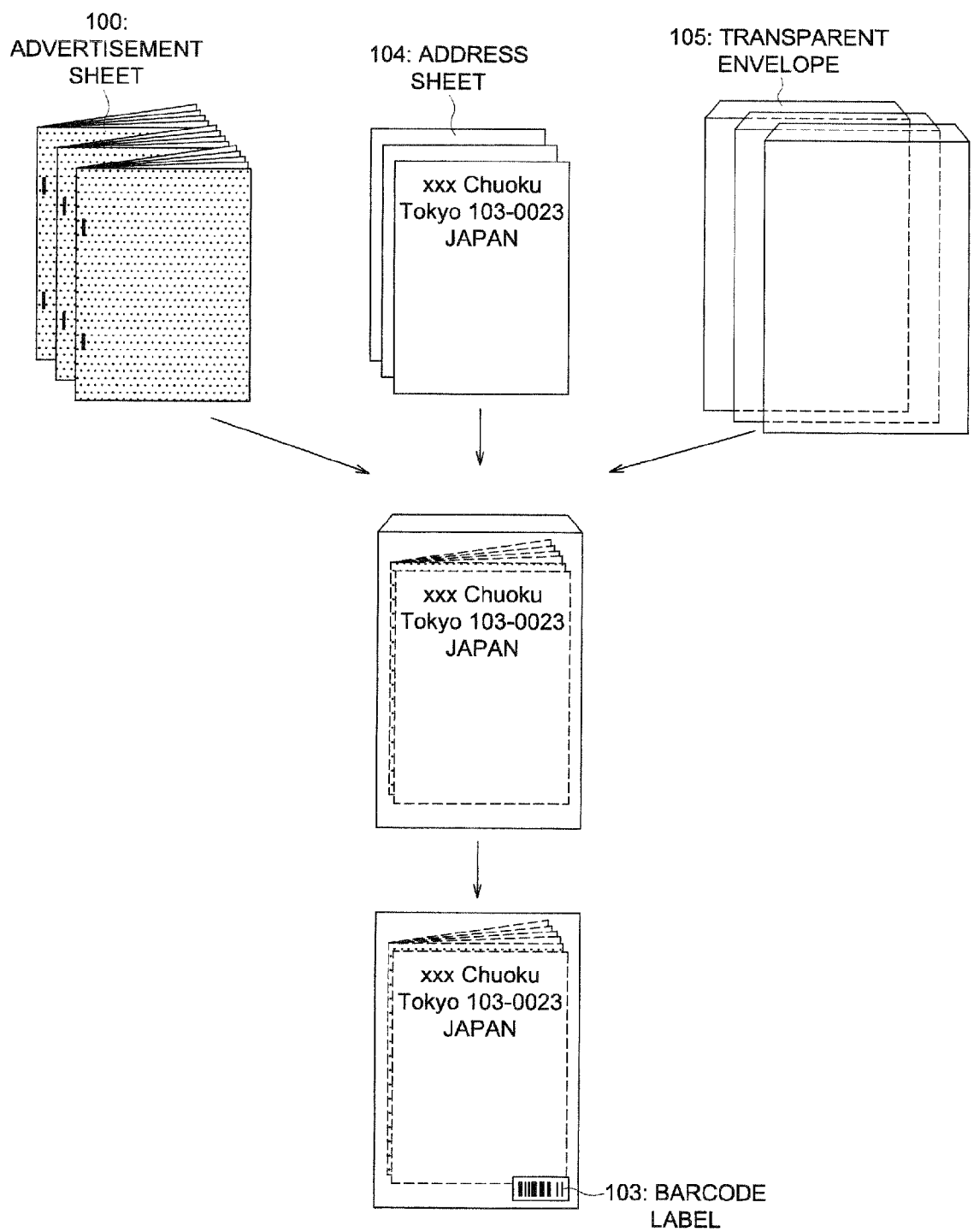
FIG. 17 is a drawing schematically representing a printed matter creation procedure in the second conventional example.
Figure 18:
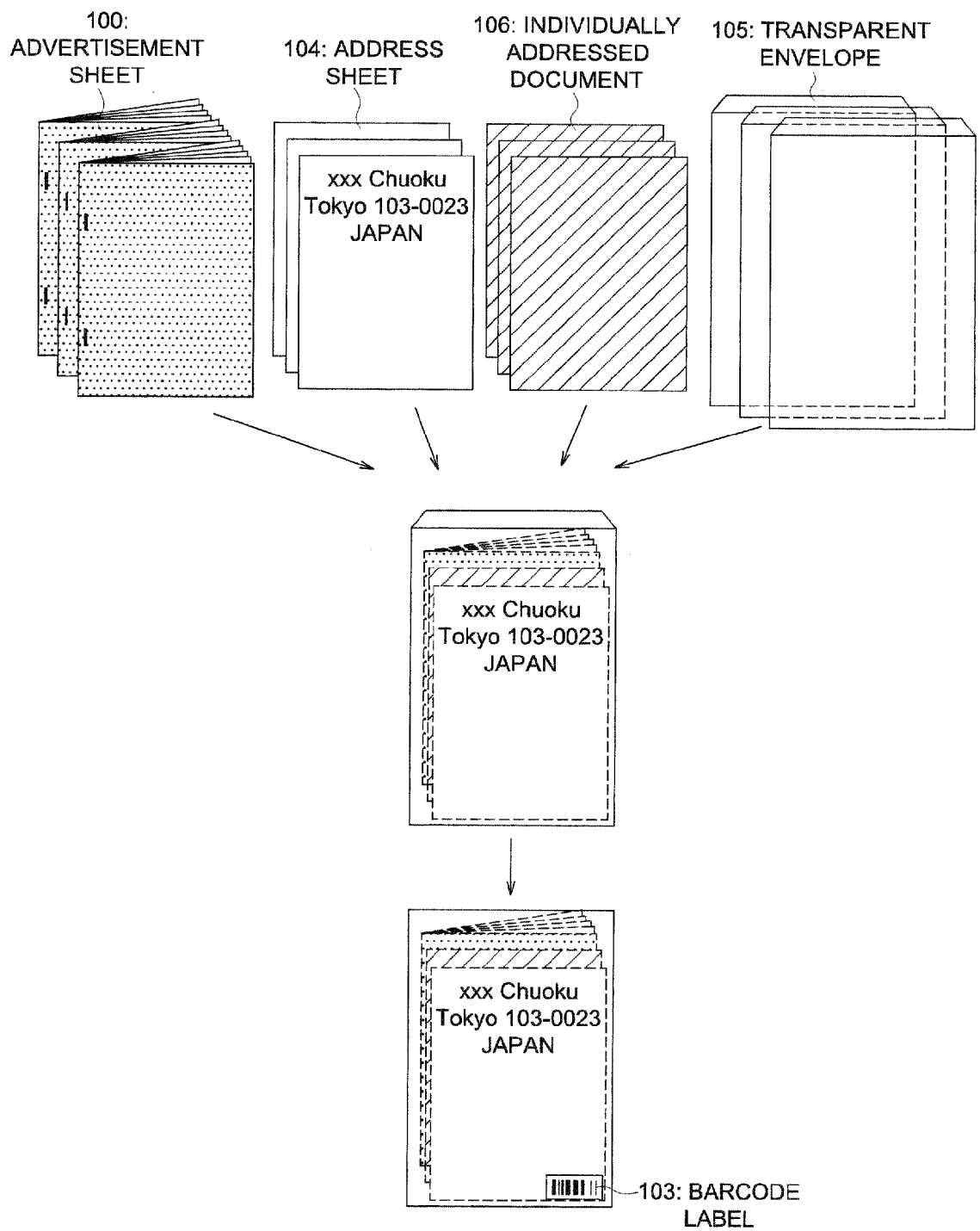
FIG. 18 is a drawing schematically representing a printed matter creation procedure in the third conventional example.

Referring to FIG. 14 and FIG. 15, the following describes the printed booklet, image forming apparatus, control program, printing system and printing method in the third embodiment of the present invention. FIG. 14 is a drawing schematically representing the structure of the printing system in this embodiment of the present invention. FIG. 15 is a flow chart showing the procedure of supplying a user with the printed booklet.

In the aforementioned first and second embodiment, the printed booklet 70 is printed at the printing service depot. In the present invention, the printing instruction information for printing a printed booklet 70 made up of integration between the cover sheet 70a and distribution sheet 70b is created, and therefore, there is no restriction to the site wherein the printed booklet 70 is printed. Thus, this embodiment shows an example wherein the printed booklet 70 is printed at the delivery service depot.

As shown in FIG. 14, the printing system 10 of this embodiment contains:

one or a plurality of order service depots for requesting direct mail of the distribution image information such as advertisement;

one or a plurality of printing service depots for creating the printing instruction information for producing a printed booklet 70 made up of integration between the cover sheet containing an address and barcode, and the distribution sheet including a distribution image information; and one or a plurality of delivery service depots wherein the printed booklet 70 is printed based on the printing instruction information and delivered to each user.

The order service depot includes one or a plurality of servers 20 which store at least the distribution image information and destination information. Further, the printing service depot creates a barcode used for the delivery management of the printed booklet 70. It includes at least one or a plurality of order management terminals 30 that create printing instruction information based on the destination information, distribution image information and barcode information. Further, the delivery service depot includes at least:

one or a plurality of image forming apparatuses 52 that print a printed booklet 70 based on the printing instruction information; and one or a plurality of delivery management terminals 50 that performs delivery management using the barcode printed on the printed booklet 70.

They are linked via the communication network 60 such as the LAN or WAN.

In FIG. 14, both the printing service depot and delivery service depot are equipped with image forming apparatuses. They need not be the same type of apparatuses. The image forming apparatus 52 at the delivery service depot is only required to have a function capable of printing a printed booklet 70. The structures of the aforementioned order management terminal 30 and image forming apparatus 52 are the same and will not be described to avoid duplication. The structure of the printed booklet 70 printed by the image forming apparatus 52 and the procedure of printing are the same as those shown in FIG. 4 through FIG. 8.

Referring to he flow chart of FIG. 15, the following describes the procedure up to the phase of delivering the printed booklet 70 to the user, using the printing system 10 of the aforementioned structure:

In Step S300, the client sends the destination information and distribution image information stored in the server 20 to the order management terminal 30, and requests a printed booklet 70 to be printed.

Then in Step S301, the order management terminal 30 receives the destination information, the distribution image information and individual destination information through the communication interface section 36 and stores the destination information in storage section 34. The order management numbers and the dates included in the lists of the destination information can be generated at the order management terminal upon receiving an order of printing.

In Step S302, the printing instruction section 35 of the order management terminal 30 creates a barcode for delivery management of each printed booklet 70. There is no particular restriction to the information to be recorded in this barcode if the information to be recorded in this barcode can be used at the delivery service depot and includes at least the order management numbers. Further, there is no restriction to the format of the barcode. This step can be omitted if the cover sheet is printed with the address alone.

In Step S303, the printing instruction section 35 lays out the cover sheet of each printed booklet 70. To put it more specifically, other information such as the address, barcode, individual destination information and advertisement is laid out at a predetermined position of the cover sheet and is displayed on the display section 32. Wherever required, the operator at the printing service depot corrects the layout of the information using the operation section 33. This layout can be provided automatically by the printing instruction section 35, or manually by the operator. Although there is no particular restriction to the layout of information, the address or barcode is preferably laid out so that it will not overlap with a strip of paper.

In Step S304, using the printing instruction screen indicated on the display section 32, the operator of the printing service depot sets printing conditions. According to at least the destination information, barcode information, distribution image information, layout information and the aforementioned setting information, the printing instruction section 35 creates the printing instruction information that allows the image forming apparatus 52 to print the printed booklet 70 for each address and sends this printing instruction information to the image forming apparatus 52 of the delivery service depot. In this case, if there are a plurality of delivery service depots, it is preferred to send the printing instruction information of the printed booklet 70 to each of the delivery service depots wherein the address is in the area under the charge of the delivery service depot. The delivery efficiency is enhanced if the printed booklet 70 is printed at the delivery service depot close to the address.

Then the image forming apparatus 52 prints the printed booklet 70 for each address according to the printing instruction information. To put it more specifically, in Step S305, the image forming section of the image forming apparatus 52 prints the cover sheet according to other information such as destination information, barcode information or advertisement. This is followed by the step of printing the distribution sheet based on the distribution image information. These series of printing operations are repeated for all the addresses. In this case, the control section of the image forming apparatus 52 monitors the sheet feed error and controls the printing section to ensure that the cover sheet and distribution sheet are printed in correct sequence. It should be noted that there is no particular restriction to the method of printing the cover sheet and distribution sheet. Printing is preferably applied to both faces.

In Step S306, the image output section of the image forming apparatus 52 applies a process of finishing such as stapling, center folding, folding in three or edge cutting to the cover sheet and distribution sheet for each address, whereby the printed booklet 70 is produced. In this embodiment as well, the cover sheet 70a and distribution sheet 70b are printed in an integrated manner. Accordingly, various forms of control can be applied. If there is small number of sheets to be printed, output can be performed after only the process of center folding has been applied. When the distribution image information runs to an odd number of pages, another image stored in advance can be printed on the excess page. Further, the cover sheet 70a and distribution sheet 70b can be stitched without being center-folded.

In Step S307, a strip of paper 73 is applied to the printed booklet 70 having been produced. In this embodiment as well, there is no particular restriction to the form of the strip of paper 73. It can be made of paper which can be easily broken, or a transparent vinyl sheet. When a transparent member is used, the address 71 and barcode 72 can be laid out at a desired position of the cover sheet 70a. When the cover sheet 70a and distribution sheet 70b are secured by stapling or the like, use of a strip of paper 73 can be omitted. It is also possible to make such arrangements that the size of the cover sheet 70a is made greater than that of the distribution sheet 70b so that one end of the cover sheet 70a will come off the edge at the time of center folding. Then opening of the printed booklet 70 can be prevented if the portion coming off the edge is folded and is glued. After that, the printed booklet 70 is loaded on a delivery cart, and each printed booklet 70 is delivered to the user identified by the address 71. In Step S308, using the terminal provided with a barcode reader 51, the personnel in charge of delivery reads the barcode 72 of the printed booklet 70, and sends the barcode information to the delivery management terminal 50 of the delivery service depot. The delivery management terminal 50 manages the delivery status of the printed booklet 70 by comparison between the barcode information sent from the terminal and the barcode information stored in the order management terminal 30.

In Step S309, upon receipt of the printed booklet 70, the user removes a strip of paper 73, and views the distribution image information of the printed booklet 70.

As described above, a printed booklet 70 is produced by integration between the cover sheet 70a and distribution sheet 70b. Thus, similarly to the case of the first and the second embodiments, the printing cost and number of operation steps can be reduced. In this embodiment, only the printing instruction information is created at the printing service depot, and the printed booklet 70 is printed for each area wherein the image forming apparatus 52 installed at the delivery service depot. This eliminates the need of sending the printed booklet 70 from the printing service depot to the delivery service depot. This has the effect of reducing the transportation cost and the number of work steps.

The aforementioned embodiment shows the case wherein the cover sheet 70a of the printed booklet 70 is printed with the address 71 and barcode 72. It is also possible to make such arrangements that the cover sheet 70a is printed with the individual destination information 74, as in the case of the second embodiment.

The aforementioned embodiments show the cases wherein the present invention is applied to the printing of a direct mail. It is to be expressly understood, however, that the present invention is not restricted thereto. The present invention can be applied to a desired form of printer matter to be delivered to a great number of users. If the printed matter can be delivered by mail service, the printed booklet 70 is delivered through a post office.

The printed booklet, image forming apparatus, control program and printing system and printing method of the present invention provide the following advantages:

The first advantage of the present invention is found in the reduction of the cost and the number of work steps. This is because, in the image forming apparatus, the cover sheet including an address, or address and barcode, or address, barcode and individual destination information using variable printing functions, and the distribution sheet including the distribution image information such as advertisements are printed in an integrated manner. They are then subjected to a process of finishing such as stapling, center folding, folding in three and edge cutting, and are formed in a printed booklet of integrated structure. This procedure eliminates the work steps of attaching an address label or barcode label, and putting the cover sheet and distribution sheet into an envelope by combining them together.

Another advantage of the present invention is found in the elimination of a possible sorting error. This is because, the cover sheet and distribution sheet are printed in an integrated manner, whereby a printed booklet of integrated structure is created. This eliminates the need of manually sorting the cover sheet or distribution sheet, and minimizes the possibility of sorting error resulting from a sheet feed error.

A third advantage of the present invention is found in the enhanced effect of advertisement. This is because the printed booklet is made up of integration between the cover sheet containing individual destination information, and the distribution sheet containing distribution image information. This arrangement minimized the possibility of only the distribution sheet being discarded, and urges the user to view the distribution image information after having verified the individual destination information.

The aforementioned advantages enhance the benefits to the client of advertisement, printing company and delivery business company, whereby use of this printing system is encouraged.

The present invention is applicable to the printed matter to be delivered to a great number of users, an apparatus and program for creating the object to be distributed, a printing system using this apparatus or program, and a printing method.

What is claimed is:

1. A printing system comprising:
an order management terminal for instructing to create a printed matter;
a first image forming apparatus which is provided at a printing service depot, and which creates the printed matter according to an instruction of the order management terminal;
a delivery management terminal for managing a delivery of the printed matter, and which is provided at a delivery service depot which is located at a different location from the printing service depot; and
a second image forming apparatus which is provided at the delivery service depot, and which creates the printed matter according to an instruction of the order management terminal;
wherein the order management terminal comprises:
a communication interface section which obtains a list of destinations including a plurality of destination information and a distribution image information; and
a printing instruction section which forms a printing instruction information including the destination information, the distribution image information, and a print setting information, and which sends the printing instruction information to at least one of the first image forming apparatus and the second image forming apparatus;
wherein each of the first image forming apparatus and the second image forming apparatus comprises:
an image forming section which executes printing of the destination information onto a cover sheet for each destination and printing of the distribution image information onto a distribution sheet continuously according to the printing instruction information; and
a finishing section which forms a printed booklet by integrating the cover sheet on which the destination information is printed and the distribution sheet on which the distribution image information is printed as one set through finishing a predetermined process to the cover sheet and to the distribution sheet; and
wherein the order management terminal sends the printing instruction information to the second image forming apparatus provided at the delivery service depot, and the second image forming apparatus creates a booklet for a destination according to the received printing instruction information.

2. The printing system according to claim 1, wherein the printing instruction section creates the printing instruction information for each destination included in the list and sends the printing instruction information to at least one of the first image forming apparatus and the second image forming apparatus, and the corresponding image forming section executes printing of the destination information onto a cover sheet and printing of the distribution image information onto a distribution sheet for each destination continuously according to the printing instruction information sent for each destination.

3. The printing system according to claim 2, wherein the list of destinations includes an image identification information for identifying the distribution image information corresponding to each destination, and the printing instruction section decides the distribution image information according to the image identification information for each destination and creates the printing instruction including the decided distribution image information.

4. The printing system according to claim 1, wherein:
the list of destinations includes an order management number corresponding to each destination,
the printing instruction section creates a barcode information including information of the order management number, creates the printing instruction information to include the barcode information, and sends the printing instruction information to at least one of the first image forming apparatus and the second image forming apparatus, and
the corresponding image forming section prints the destination information and a barcode based on the barcode information.

5. The printing system according to claim 4, wherein the order management terminal sends the barcode information created at the printing instruction section to the delivery management terminal.

6. The printing system according to claim 5, wherein the delivery management terminal manages a distribution condition of the printed matter by comparing information obtained by reading the barcode printed on the printed matter of the printed booklet and the barcode information received from the order management terminal.

7. The printing system according to claim 1, wherein the printing instruction information includes a layout information and the image forming section decides a print layout of the destination information based on the layout information and prints the destination information on the cover sheet according to the print layout decided.

8. The printing system according to claim 1, wherein the printing instruction information includes advertisement image information and the image forming section prints the advertisement image information on the cover sheet or on a back cover sheet.

9. The printing system according to claim 1, wherein the printing instruction information includes information for informing an individual user specified by the destination information and the image forming section prints the information for informing the specified individual user on the cover sheet.

10. A printing method of a printing system which comprises (i) an order management terminal for instructing to create a printed matter, (ii) a first image forming apparatus which is provided at a printing service depot and which creates the printed matter according to an instruction of the order management terminal, (iii) a delivery management terminal for managing a delivery of the printed matter, and which is provided at a delivery service depot which is located at a different location from the printing service depot, and (iv) a second image forming apparatus which is provided at the delivery service depot, and which creates the printed matter according to an instruction of the order management terminal, the printing method comprising:
obtaining, by the order management terminal, a list of destinations including a plurality of destination information and a distribution image information;

forming, by the order management terminal, a printing instruction information including the destination information, the distribution image information, and a print setting information, and sending the printing instruction information from the order management terminal to at least one of the first image forming apparatus and the second image forming apparatus;

executing, by said at least one of the first image forming apparatus and the second image forming apparatus, printing of the destination information onto a cover sheet for each destination and printing of the distribution image information onto a distribution sheet continuously according to the printing instruction information; and forming, by said at least one of the first image forming apparatus and the second image forming apparatus, a printed booklet by integrating the cover sheet on which the destination information is printed and the distribution sheet on which the distribution image information is printed as one set through finishing a predetermined process to the cover sheet and to the distribution sheet;

wherein the printing instruction information is sent by the order management terminal to the second image forming apparatus provided at the delivery service depot, and a booklet is created for a destination according to the received printing instruction information by the second image forming apparatus.

11. The printing method according to claim 10, further comprising:

creating, by the order management terminal, the printing instruction information for each destination included in the list and sending the printing instruction information from the order management terminal to at least one of the first image forming apparatus and the second image forming apparatus; and executing, by said at least one of the first image forming apparatus and the second image forming apparatus, printing of the destination information onto a cover sheet for each destination and printing of the distribution image information onto a distribution sheet continuously according to the printing instruction information sent for each destination.

12. The printing method to claim 11, wherein the list of destinations includes an image identification information for identifying the distribution image information corresponding to each destination, and wherein the printing method further comprises deciding, by the order management terminal, the distribution image information according to the image identification information for each destination and creating the printing instruction including the decided distribution image information.

13. The printing method according to claim 10, wherein the list of destinations includes an order management number corresponding to each destination, and wherein the printing method further comprises:

creating, by the order management terminal, a barcode information including information of the order management number, creating, by the order management terminal, the printing instruction information including the barcode information, and sending, by the order management terminal, the printing instruction information to at least one of the first image forming apparatus and the second image forming apparatus; and printing, by said at least one of the first image forming apparatus and the second image forming apparatus, the destination information and a barcode based on and the barcode information.

14. The printing method according to claim 10, further comprising sending the barcode information created by the order management terminal from the order management terminal to the delivery management terminal.

15. The printing method according to claim 10, wherein the printing instruction information includes a layout information, and the printing method further comprising deciding, by at least one of the first image forming apparatus and the second image forming apparatus, a print layout of the destination information based on the layout information and printing, by said at least one of the first image forming apparatus and the second image forming apparatus, the destination information on the cover sheet according to the decided print layout.

16. The printing method according to claim 10, wherein the printing instruction information includes advertisement image information and the printing method further comprises printing, by at least one of the first image forming apparatus and the second image forming apparatus, the advertisement image information on the cover sheet or on a back cover sheet.

17. The printing method of a printing system according to claim 10, wherein the printing instruction information includes information for informing an individual user specified by the destination information, and wherein the printing method further comprises printing, by at least one of the first image forming apparatus and the second image forming apparatus, the information for informing the specified individual user on the cover sheet.

* * * * *